(12) United States Patent
Abraham et al.

(10) Patent No.: US 11,315,172 B2
(45) Date of Patent: *Apr. 26, 2022

(54) SYSTEMS AND METHODS FOR FACILITATING FEED IN A NETWORK-BASED MARKETPLACE

(71) Applicant: eBay Inc., San Jose, CA (US)

(72) Inventors: Jack Philip Abraham, Palo Alto, CA (US); Andrew David Palmer, Campbell, CA (US); Jeffrey Tyson, San Jose, CA (US); Christina Mercando, Brooklyn, NY (US); Jason Kotenko, San Jose, CA (US); Benjamin Gleitzman, Alameda, CA (US); Kyle Lee, San Jose, CA (US)

(73) Assignee: eBay Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/931,509

(22) Filed: May 13, 2020

(65) Prior Publication Data
US 2020/0273088 A1     Aug. 27, 2020

Related U.S. Application Data

(63) Continuation of application No. 15/696,539, filed on Sep. 6, 2017, now Pat. No. 10,692,131, which is a (Continued)

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06Q 30/0601* (2013.01); *G06Q 30/08* (2013.01); *G06Q 50/01* (2013.01)

(58) Field of Classification Search
CPC .................................................... G06Q 30/00
See application file for complete search history.

(56) References Cited

U.S. PATENT DOCUMENTS 6,975,937 B1   12/2005 Kantarjiev et al.
7,177,825 B1    2/2007 Borders et al.
(Continued)

FOREIGN PATENT DOCUMENTS

WO      2001/80147 A2    10/2001
WO    WO-2012106273 A2 *  8/2012  ............. G06Q 30/02
(Continued)

OTHER PUBLICATIONS

Etsy news blog, "Shop Together: Circles and Activities Feeds", Blog.etsy.com, dated Dec. 1, 2010. (Year: 2010).*
(Continued)

*Primary Examiner* — Mark A Fadok
(74) *Attorney, Agent, or Firm* — FIG. 1 Patents

(57) ABSTRACT

Feeds in a network-based marketplace are described. The system receives a request, over a network, from a user that is associated with feed selection information, and identifies source feeds based on the feed selection information. The source feeds respectively include a first plurality of content elements. The system generates a presentation feed by retrieving a second plurality of content elements from the source feeds. The generating is performed continuously and in real-time. The system segments the presentation feed into pages and generates interfaces that include a first interface based on the pages. The system communicates the first interface, over the network, to the user, responsive to the receiving of the request.

20 Claims, 12 Drawing Sheets

Related U.S. Application Data continuation of application No. 13/946,911, filed on Jul. 19, 2013, now Pat. No. 9,786,001.

(60) Provisional application No. 61/798,201, filed on Mar. 15, 2013, provisional application No. 61/696,633, filed on Sep. 4, 2012.

(51) Int. Cl.
    *G06Q 50/00* (2012.01)
    *G06Q 30/08* (2012.01)

(56) References Cited

U.S. PATENT DOCUMENTS

| | | |
|---|---|---|
| 7,640,184 B1 | 12/2009 | Lunt |
| 8,312,381 B2 | 11/2012 | Jorasch |
| 8,930,204 B1* | 1/2015 | Igoe .................. G06F 16/9535 705/2 |
| 8,990,701 B2 | 3/2015 | Olofsson |
| 9,786,001 B2 | 10/2017 | Abraham et al. |
| 10,692,131 B2 | 6/2020 | Abraham et al. |
| 2001/0011284 A1 | 8/2001 | Humpleman et al. |
| 2001/0047327 A1 | 11/2001 | Courtney |
| 2004/0181753 A1 | 9/2004 | Michaelides |
| 2005/0010424 A1 | 1/2005 | Sherman et al. |
| 2005/0081251 A1 | 4/2005 | Walker et al. |
| 2006/0156255 A1 | 7/2006 | Bedingfield |
| 2006/0161845 A1 | 7/2006 | Kahn et al. |
| 2006/0173985 A1 | 8/2006 | Moore |
| 2006/0190290 A1 | 8/2006 | Gomez |
| 2006/0218577 A1 | 9/2006 | Goodman et al. |
| 2007/0083536 A1 | 4/2007 | Darnell et al. |
| 2007/0185778 A1 | 8/2007 | Weng |
| 2007/0192204 A1 | 8/2007 | Pitkow |
| 2007/0276741 A1 | 11/2007 | Tuttrup et al. |
| 2008/0126476 A1 | 5/2008 | Nicholas et al. |
| 2008/0140621 A1 | 6/2008 | Martinez et al. |
| 2009/0049380 A1 | 2/2009 | Rehling et al. |
| 2009/0049403 A1 | 2/2009 | Jones |
| 2009/0089294 A1 | 4/2009 | Davis et al. |
| 2009/0119167 A1 | 5/2009 | Kendall et al. |
| 2009/0300511 A1 | 12/2009 | Behar et al. |
| 2009/0303676 A1 | 12/2009 | Behar et al. |
| 2009/0322790 A1 | 12/2009 | Behar et al. |
| 2010/0010902 A1 | 1/2010 | Casey |
| 2010/0125810 A1 | 5/2010 | Misumi et al. |
| 2010/0145820 A1 | 6/2010 | Johnson et al. |
| 2010/0153848 A1 | 6/2010 | Saha |
| 2010/0280860 A1 | 11/2010 | Iskold et al. |
| 2010/0293036 A1 | 11/2010 | Meyer et al. |
| 2011/0035264 A1* | 2/2011 | Zaloom .................. G06Q 30/06 705/14.12 |
| 2011/0055930 A1 | 3/2011 | Flake et al. |
| 2011/0191417 A1 | 8/2011 | Rathod |
| 2012/0078731 A1 | 3/2012 | Linevsky et al. |
| 2012/0078917 A1* | 3/2012 | Gradin .............. G06F 16/24578 707/748 |
| 2012/0084151 A1 | 4/2012 | Kozak et al. |
| 2012/0102402 A1* | 4/2012 | Kwong .................. G06Q 50/01 715/705 |
| 2012/0185356 A1 | 7/2012 | Barron et al. |
| 2012/0233020 A1 | 9/2012 | Eberstadt et al. |
| 2012/0278127 A1 | 11/2012 | Kirakosyan et al. |
| 2012/0324507 A1 | 12/2012 | Weber |
| 2013/0041893 A1 | 2/2013 | Strike |
| 2013/0097253 A1* | 4/2013 | Mencke .................. H04L 67/10 709/206 |
| 2013/0104070 A1 | 4/2013 | Blake et al. |
| 2013/0117353 A1* | 5/2013 | Wong .................. G06F 16/9535 709/203 |
| 2013/0311560 A1 | 11/2013 | Schleier et al. |
| 2014/0006170 A1 | 1/2014 | Collette et al. |
| 2014/0067623 A1 | 3/2014 | Abraham et al. |
| 2014/0108946 A1 | 4/2014 | Olofsson |
| 2014/0143047 A1 | 5/2014 | Carter et al. |
| 2014/0279049 A1 | 9/2014 | Wiseman et al. |
| 2014/0279283 A1 | 9/2014 | Budaraju et al. |
| 2014/0297470 A1 | 10/2014 | Ramadge et al. |
| 2014/0324725 A1 | 10/2014 | Edmonds et al. |
| 2017/0372409 A1 | 12/2017 | Abraham et al. |

FOREIGN PATENT DOCUMENTS

| | | |
|---|---|---|
| WO | 2014/039389 A1 | 3/2014 |
| WO | 2014/160857 A2 | 10/2014 |
| WO | 2014/160857 A3 | 11/2014 |

OTHER PUBLICATIONS

Vaughan, Pamela, "Facebook Launches 'Interest Lists' (Why Marketers Should Care)", hubspot.com, dated Mar. 8, 2012. (Year: 2012).*
Salesforce Help, "Feed Tracking", salesforce.com, dated Jul. 26, 2012. (Year: 2012).*
Advisory Action received for U.S. Appl. No. 15/696,539, dated Jan. 30, 2020, 3 pages.
Applicant Initiated Interview Summary received for U.S. Appl. No. 15/696,539, dated Jan. 14, 2020, 3 pages.
Final Office Action received for U.S. Appl. No. 15/696,539, dated Nov. 19, 2019, 17 pages.
First Action Interview Pre-Interview Communication received for U.S. Appl. No. 15/696,539, dated Apr. 19, 2019, 19 pages.
First Action Interview-Office Action Summary received for U.S. Appl. No. 15/696,539, dated Jul. 17, 2019, 19 pages.
Notice of Allowance received for U.S. Appl. No. 15/696,539, dated Feb. 21, 2020, 9 pages.
Preliminary Amendment received for U.S. Appl. No. 15/696,539, filed Oct. 11, 2017, 10 pages.
Response to Final Office Action filed on Jan. 20, 2020, for U.S. Appl. No. 15/696,539, dated Nov. 19, 2019, 13 pages.
Response to First Action Interview Office Action summary filed on Sep. 16, 2019, for U.S. Appl. No. 15/696,539, dated Jul. 17, 2019, 13 pages.
Response to Pre-Interview Communication filed on May 20, 2019, for U.S. Appl. No. 15/696,539, dated Apr. 19, 2019, 3 pages.
Sungard's Data Aggregation Service, Sungard Solutions for Wealth Management, Apr. 2009, 2 pages.
Non-Final Office Action received for U.S. Appl. No. 13/946,911, dated Feb. 8, 2017, 17 pages.
Notice of Allowance received for U.S. Appl. No. 13/946,911, dated Jun. 7, 2017, 9 pages.
Response to Non-Final Office Action filed on May 8, 2017, for U.S. Appl. No. 13/946,911, dated Feb. 8, 2017, 28 pages.
Final Office Action received for U.S. Appl. No. 14/063,537, dated Sep. 8, 2017, 7 pages.
Final Office Action received for U.S. Appl. No. 14/063,537, dated Aug. 27, 2018, 13 pages.
Final Office Action received for U.S. Appl. No. 14/063,537, dated Sep. 27, 2019, 12 pages.
Non-Final Office Action received for U.S. Appl. No. 14/063,537, dated Mar. 27, 2018, 11 pages.
Non-Final Office Action received for U.S. Appl. No. 14/063,537, dated Mar. 9, 2017, 14 pages.
Non-Final Office Action received for U.S. Appl. No. 14/063,537, dated Mar. 21, 2019, 7 pages.
Response to Final Office Action filed on Jan. 2, 2018, for U.S. Appl. No. 14/063,537, dated Sep. 8, 2017, 23 pages.
Response to Final Office Action filed on Nov. 27, 2018, for U.S. Appl. No. 14/063,537, dated Aug. 27, 2018, 12 pages.
Response to Non-Final Office Action filed on Jun. 9, 2017, for U.S. Appl. No. 14/063,537, dated Mar. 9, 2017, 23 pages.
Response to Non-Final Office Action filed on Jun. 19, 2019, for U.S. Appl. No. 14/063,537, dated Mar. 21, 2019, 15 pages.
Response to Non-Final Office Action filed on Jun. 27, 2018, for U.S. Appl. No. 14/063,537, dated Mar. 27, 2018, 15 pages.
Final Office Action received for U.S. Appl. No. 14/211,228, dated Jan. 28, 2019, 24 pages.

(56) References Cited

OTHER PUBLICATIONS

Final Office Action received for U.S. Appl. No. 14/211,228, dated Feb. 27, 2017, 10 pages.
Final Office Action received for U.S. Appl. No. 14/211,228, dated Jan. 10, 2018, 27 pages.
Non-Final Office Action received for U.S. Appl. No. 14/211,228, dated Aug. 20, 2015, 10 pages.
Non-Final Office Action received for U.S. Appl. No. 14/211,228, dated Jul. 3, 2018, 36 pages.
Non-Final Office Action received for U.S. Appl. No. 14/211,228, dated Jun. 28, 2017, 25 pages.
Non-Final Office Action received for U.S. Appl. No. 14/211,228, dated Mar. 22, 2016, 10 pages.
Response to Final Office Action filed on Feb. 28, 2018, for U.S. Appl. No. 14/211,228, dated Jan. 10, 2018, 17 pages.
Response to Final Office Action filed on May 30, 2017, for U.S. Appl. No. 14/211,228, dated Feb. 27, 2017, 18 pages.
Response to Non-Final Office Action filed on Jul. 22, 2016, for U.S. Appl. No. 14/211,228, dated Mar. 22, 2016, 20 pages.
Response to Non-Final Office Action filed on Nov. 20, 2015, for U.S. Appl. No. 14/211,228, dated Aug. 20, 2015, 18 pages.
Response to Non-Final Office Action filed on Oct. 1, 2018, for U.S. Appl. No. 14/211,228, dated Jul. 3, 2018, 19 pages.
Response to Non-Final Office Action filed on Sep. 28, 2017, for U.S. Appl. No. 14/211,228, dated Jun. 28, 2017, 16 pages.
First Examiner Report received for Australian Patent Application No. 2014241136, dated Jun. 21, 2016, 3 pages.
Written Opinion received for PCT Application No. PCT/US2014/032002, dated Sep. 15, 2014, 6 pages.
International Search Report received for PCT Application No. PCT/US2014/032002, dated Sep. 15, 2014, 2 pages.
Written Opinion received for PCT Application No. PCT/US2013/057520, dated Dec. 20, 2013, 4 pages.
International Search Report received for PCT Application No. PCT/US2013/057520, dated Dec. 20, 2013, 2 pages.
International Preliminary Report on Patentability received for PCT Application No. PCT/US2013/057520, dated Mar. 19, 2015, 6 pages.
Office Action received for Canadian Patent Application No. 2,903,876, dated Oct. 28, 2016, 3 pages.
Banos et al., "Perso News: A Personalized News Reader Enhanced by Machine Learning and Semantic Filtering", Aristotle University of Thessaloniki, dated: Circa 2006, 2006, pp. 975-982.
International Preliminary Report on Patentability received for PCT Application No. PCT/US2014/032002, dated Oct. 8, 2015, 8 pages.

* cited by examiner

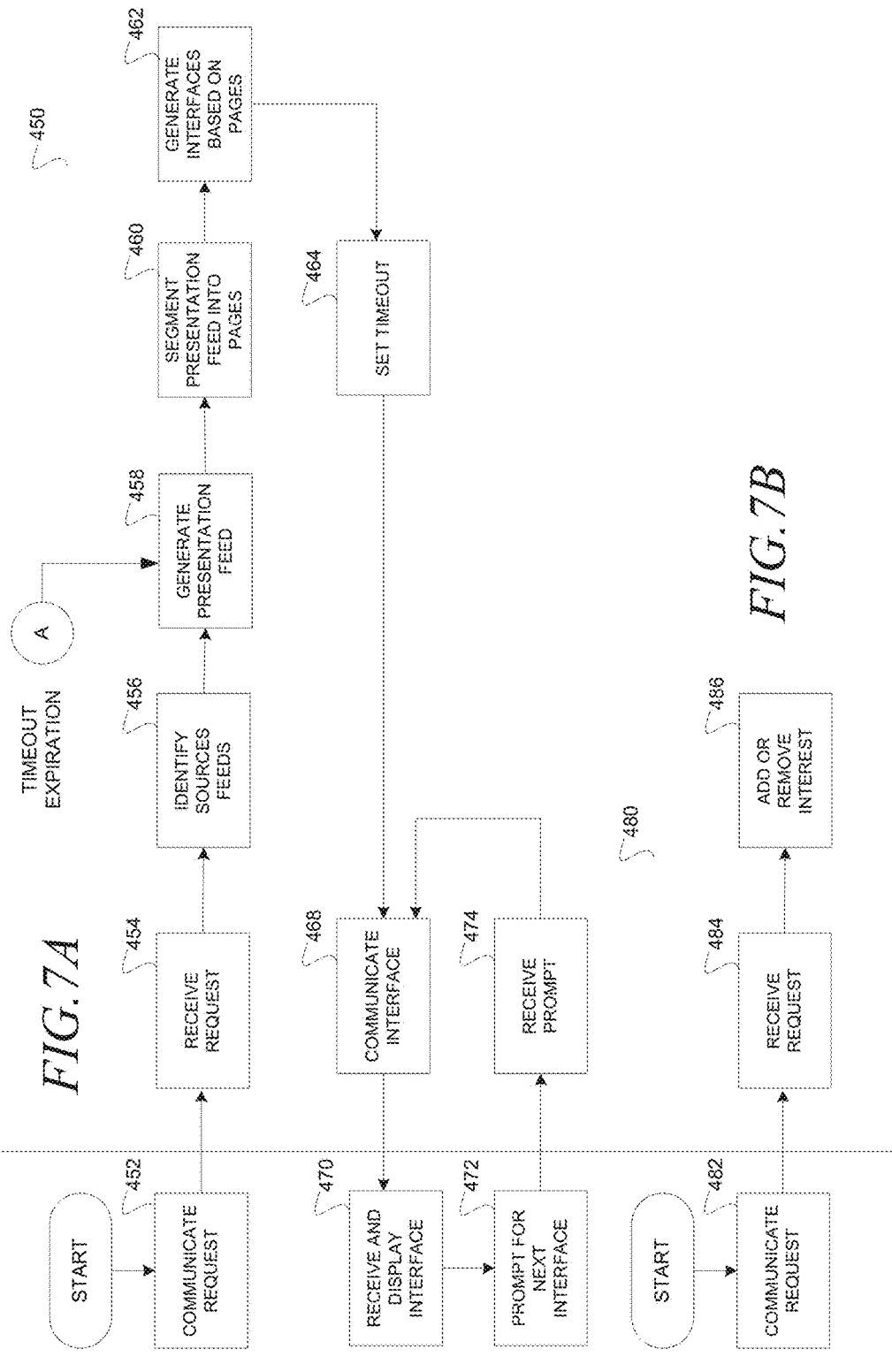

SYSTEMS AND METHODS FOR FACILITATING FEED IN A NETWORK-BASED MARKETPLACE

RELATED APPLICATIONS

This application is a continuation of and claims the benefit of priority to U.S. patent application Ser. No. 15/696,539, filed on Sep. 6, 2017, which is a continuation of and claims the benefit of priority to U.S. patent application Ser. No. 13/946,911, filed on Jul. 19, 2013 (now issued as U.S. Pat. No. 9,786,001), which claims the benefit of priority to both of: U.S. Provisional Application No. 61/696,633, filed Sep. 4, 2012, and U.S. Provisional Application No. 61/798,201, filed Mar. 15, 2013 all of which are incorporated in their entireties by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

This disclosure relates to the technical field of data communications. More particularly, systems and methods for facilitating feed in a network-based marketplace.

BRIEF DESCRIPTION OF THE DRAWINGS

Embodiments illustrated, by way of example and not limitation, in the figures of the accompanying drawings, in which:

FIG. 7A is a block diagram illustrating a method, according to an embodiment, to facilitate feed in a network-based marketplace;

FIG. 7B is a block diagram illustrating a method, according to an embodiment, to add or remove an interest;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

A network-based marketplace is a website or a mobile application where a user may buy or sell goods or services (referred to collectively as "items") from a provider of the online marketplace or other users of the online marketplace. A feed is an aggregation of selected pieces of content provided to the user in a network-based marketplace. The aggregation may appear to the user as a webpage or other graphical user interface. The content may include listings describing items for sale, related articles, reviews of items for sale, reviews of (or other information about) sellers, information about the online marketplace, special offers or discounts available to the user, information about people identified by the user as a "friend" in a social network, or other information determined to be relevant to the user. The content element may be presented as a thumbnail (of one of a plurality of available thumbnail sizes) that is selectable by the user to perform one or more actions such as a detailed view of the content, an option to be provided updates to the content ("watch" the content), an option to be provided further content that is similar to the selected content, to buy an item described by the content, or to share the content with one or more other users via various channels (e.g., email, chat, Facebook, Twitter, Pinterest, etc.).

Figure 1:
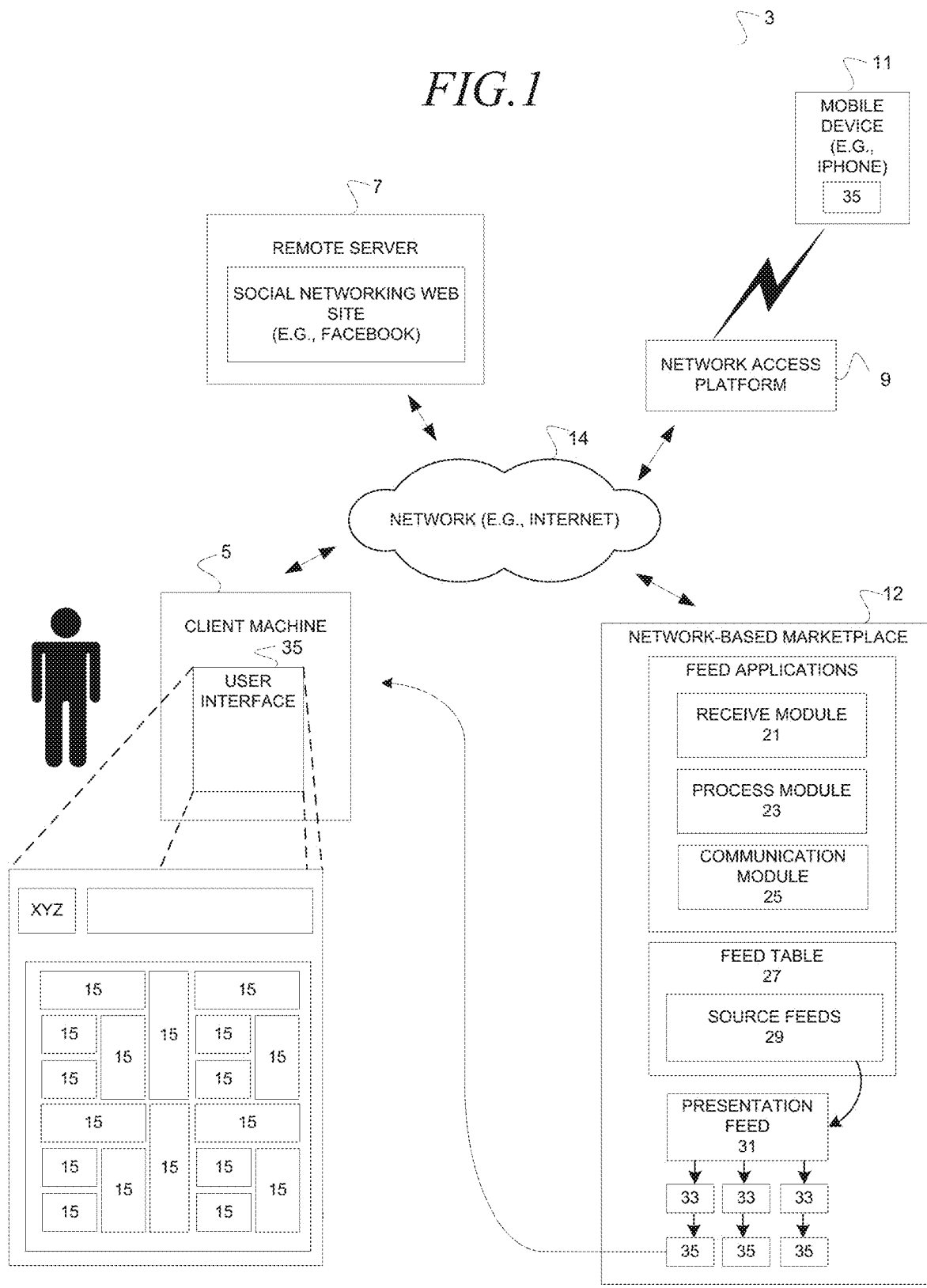
FIG. 1 illustrates a system, according to an embodiment, for facilitating feed in a network-based marketplace.

FIG. 1 illustrates a system 3, according to an embodiment, to facilitate feed in a network-based marketplace (e.g., online marketplace). The system 3 is shown to include a client machine 5, a social networking web site 7 that is hosted on a remote server, a network access platform 9 providing connectivity to a mobile device 11, and a network-based marketplace 12. The client machine 9, social networking web site 7 and the mobile device 11, respectively, communicate over a network 14 with the network-based marketplace 12. In one embodiment, the network-based marketplace 12 may communicate a user interface 35 that includes content elements 15 to the client machine 9 or the mobile device 11. The content elements 15 may include listings of items for sale on the network-based marketplace 12 and other information. The user interface 35 including the content elements 15 may be generated and communicated to the user by feed applications that execute on the network-based marketplace 12. The feed applications may include a receive module 21, a process module 23, and a communication module 25. The receive module 21 may receive a request from a user and associate the request of the user with feed selection information. The feed selection information may be configured by the user. In one instance the feed selection information may be configured by receiving a selection from a user that identifies an interest of the user. The process module 23 may utilize the feed selection information to access a feed table 27 to identify multiple source feeds 29 that respectively include different types of content elements 15. For example, one source feed 29 may include listings that describe items that are for sale on the network-based marketplace 12 and that have relevance to the user. The process module 23 may further utilize content selection information to select the content elements. The content selection information may be configured by the user. In one instance the content selection information may be configured by receiving a selection from a user that identifies an interest of the user. The content selection information may be utilized to identify content elements in the source feeds 29 and generate a presentation feed 31. For example, the process module 23 may generate the presentation feed 31 by selecting the content elements 15 from the source feeds 29 based on content selection information. The process module 23 may generate the presentation feed 31 continuously in real-time, segment the presentation feed 31 into multiple pages, and generate one or more interfaces (e.g., client machine user interface and mobile device user interface) based on the pages. Finally, the communication module 25 may communicate an interface over the network to the user responsive to receipt of the request. In some instances the user may indefinitely prompt the network-based marketplace 12 for communication of subsequent interfaces as the presentation feed 31 is continuously generated in real-time.

The social networking web site 7 may be embodied as FACEBOOK® services, a social utility that connects people with friends and others who work, study and live around them provided by Facebook of Palo Alto, Calif. In one embodiment one or more of the source feeds 29 associated with the user may be identified based on a "friend" of the user. For example, the user may be associated with one or more other users on the network-based marketplace 12 or the social networking web site 7 as a "friend" and the source feed 29 associated with the "friend" may be used to generate the presentation feed 31 of the user.

The mobile device 11 may be embodied as an iPhone mobile phone manufactured by Apple, Inc. of Cupertino, Calif. or, as, a Blackberry™ mobile phone manufactured by Research In Motion of Waterloo, Ontario. The interface 35 that is generated for the mobile 11 device may be different from the interface generated for the client machine 5.

Figure 2:
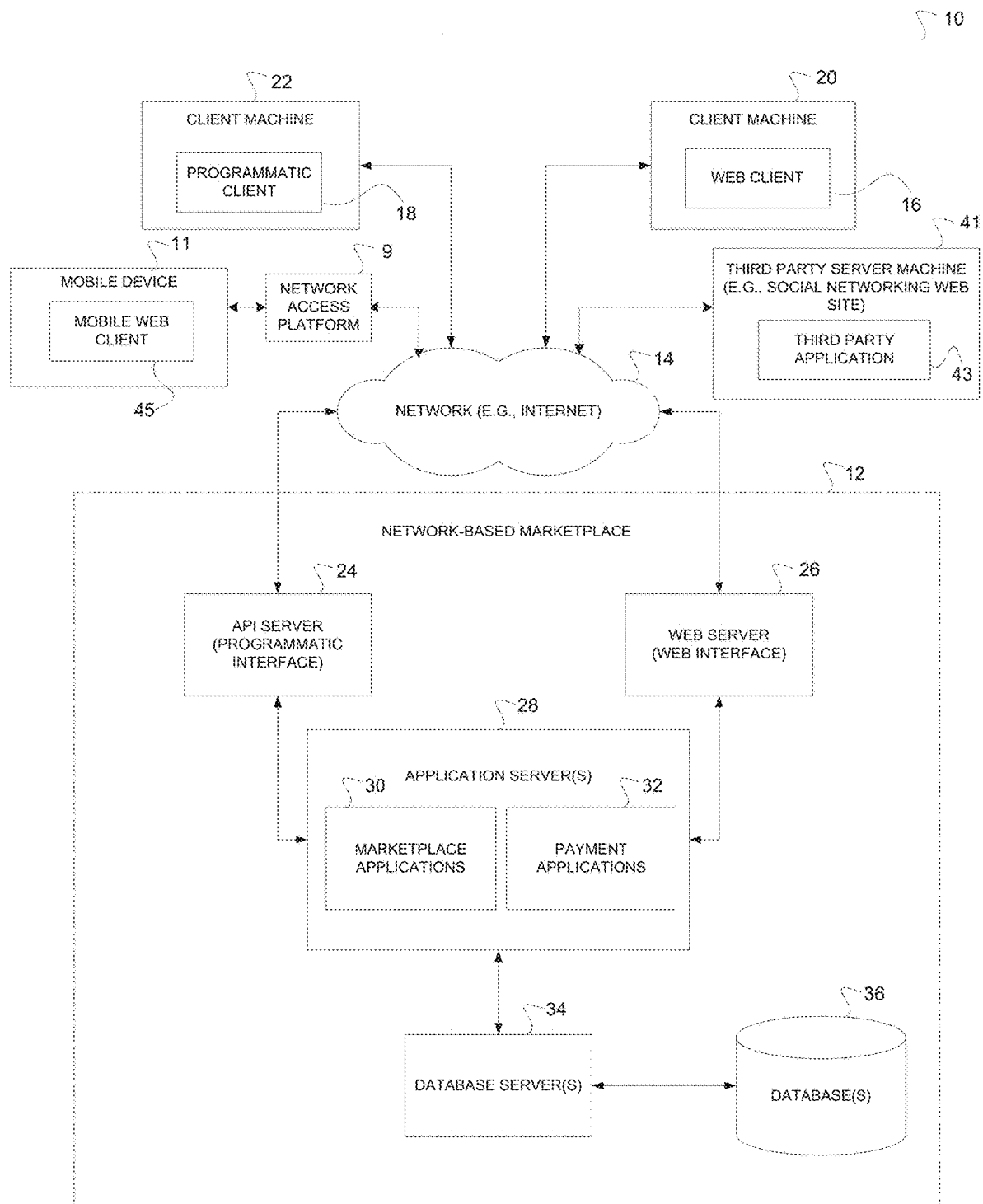
FIG. 2 further illustrates a system, according to an embodiment, to facilitate feed in an network-based marketplace.

FIG. 2 further illustrates a system 10, according to an embodiment, to facilitate feed in a network-based marketplace 12. The networked system 10 corresponds to the system 3 in FIG. 1 and, accordingly, the same or similar references have been used to indicate the same or similar features unless otherwise indicated. The network-based marketplace 12 provides server-side functionality, via a network 14 (e.g., the Internet or Wide Area Network (WAN)) to one or more clients. FIG. 2 illustrates, for example, a web client 16 (e.g., a browser, such as the Internet Explorer browser developed by Microsoft Corporation of Redmond, Wash. State) executing on client machine 20, a programmatic client 18 executing on client machine 22, and a mobile web client 45 executing on mobile device 11. For example, the mobile web client 45 may be embodied as one or more mobile modules that are used to support the Blackberry™ wireless hand held business or smart phone manufactured by Research In Motion of Waterloo, Ontario.

An Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 may provide a number of marketplace functions and services to users that access the network-based marketplace 12. The payment applications 32 may likewise provide a number of payment services and functions to users. The payment applications 32 may allow users to accumulate value in accounts and then to later redeem the accumulated value for products (e.g., goods or services) that are made available via the marketplace applications 30. The value may be accumulated in a commercial currency, such as the U.S. dollar, or a proprietary currency, such as "points." While the marketplace applications 30 and payment applications 32 are shown in FIG. 2 to both form part of the network-based marketplace 12, it will be appreciated that, in alternative embodiments, the payment applications 32 may form part of a payment service that is separate and distinct from the network-based marketplace 12.

Further, while the networked system 10 shown in FIG. 2 employs client-server architecture, embodiments of the present disclosure are of course not limited to such an architecture and could equally well find application in a distributed, or peer-to-peer, architecture system, for example. The various marketplace applications 30 and payment applications 32 could also be implemented as standalone software programs, which do not necessarily have networking capabilities.

The web client 16 and mobile web client 45 access the various marketplace applications 30 and payment applications 32 via the web interface supported by the web server 26. Similarly, the programmatic client 18 accesses the various services and functions provided by the marketplace applications 30 and payment applications 32 via the programmatic interface provided by the API server 24. The programmatic client 18 may, for example, be a seller application (e.g., the TurboLister application developed by eBay Inc., of San Jose, Calif.) to enable sellers to author and manage listings on the network-based marketplace 12 in an off-line manner, and to perform batch-mode communications between the programmatic client 18 and the network-based marketplace 12.

FIG. 2 also illustrates a third party application 43, executing on a third party server machine 41, as having programmatic access to the networked system 10 via the programmatic interface provided by the API server 24. The third party application 43 may communicate feed selection information and content selection information to the network-based marketplace. In one embodiment the feed selection information and the content selection information may be associated with a user that is registered on the network-based marketplace 12 and the third party server machine 41 (e.g., social networking web site). The third party website may communicate user interfaces to the client machines 22, 20 or mobile device 11.

The mobile device 11 may be embodied as a mobile phone, a personal digital assistant (PDA), a cell phone, or any other wireless device that is capable of communicating with the network-based marketplace 12. For example, the mobile device 11 may be embodied as an iPhone mobile phone manufactured by Apple, Inc. of Cupertino, Calif. or, as previously mentioned, a Blackberry™ mobile phone manufactured by Research In Motion of Waterloo, Ontario.

Marketplace and Payment Applications

Figure 3:
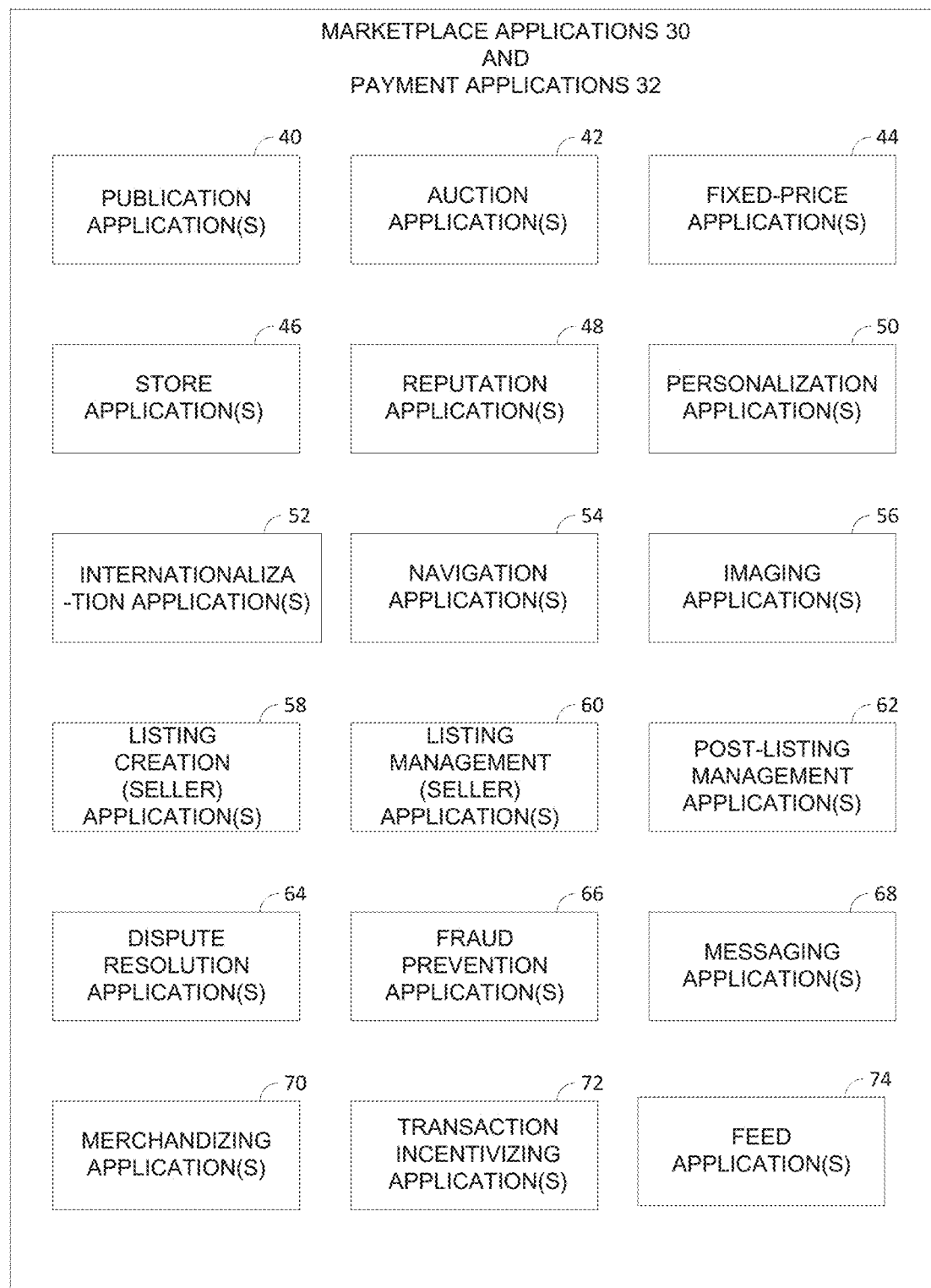
FIG. 3 is a block diagram illustrating marketplace applications and payment applications, according to an embodiment.

FIG. 3 is a block diagram illustrating marketplace applications 30 and payment applications 32 that, in one example embodiment, are provided as part of the networked system 10 of FIG. 2. The marketplace applications 30 and payment applications 32 may be hosted on dedicated or shared server machines, as shown on FIG. 2, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 36 via the database servers 34, as shown on FIG. 2.

The network-based marketplace 12 of FIG. 2 may provide a number of publishing, listing and price-setting mechanisms whereby a seller may list (or publish information concerning) goods or services for sale; a buyer may indicate a desire to purchase such goods or services; and a price can be set for a transaction pertaining to the goods or services. To this end, the marketplace applications 30 are shown to include at least one publication application 40 and one or more auction applications 42 which support auction-format listing and price setting mechanisms (e.g., English, Dutch, Vickrey, Chinese, Double, Reverse auctions, etc.). The various auction applications 42 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 46 allows a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the network-based marketplace 12, to establish, build and maintain reputations, which may be made available and published to potential trading partners. Consider that where, for example, the network-based marketplace 12 supports person-to-person trading, users may otherwise have no history or other reference information whereby the trustworthiness and credibility of potential trading partners may be assessed. The reputation applications 48 allow a user to establish a reputation within the network-based marketplace 12 over time, for example, through feedback provided by other transaction partners and by the computation of a feedback score based on the feedback. For example, the feedback score may be publicly displayed by the network-based marketplace 12. Other potential trading partners may then reference such a feedback score for the purposes of assessing credibility and trustworthiness.

Personalization applications 50 allow users of the network-based marketplace 12 to personalize various aspects of their interactions with the network-based marketplace 12. For example, a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 10 and other parties.

The networked system 10 may support a number of marketplaces that are customized, for example, for specific geographic regions. A version of the networked system 10 may be customized for the United Kingdom, whereas another version of the networked system 10 may be customized for the United States. Some of these versions may operate as an independent marketplace, or may be customized (or internationalized) presentations of a common underlying marketplace. The networked system 10 may accordingly include a number of internationalization applications 52 that customize information (and/or the presentation of information) by the networked system 10 according to predetermined criteria (e.g., geographic, demographic or marketplace criteria). For example, the internationalization applications 52 may be used to support the customization of information for a number of regional websites that are operated by the networked system 10 and that are accessible via respective servers 24 and 26 both of FIG. 2.

Navigation of the network-based marketplace 12 may be facilitated by one or more navigation applications 54. For example, the network-based marketplace 12 may receive search information to search for items on the network-based marketplace and a processing application may process that request. A browse application may allow users to browse various category, catalogue, or inventory data structures according to which listings may be classified within the networked system 10. Various other navigation applications may be provided to supplement the search and browsing applications.

In order to make listings available via the networked system 10 as visually informing and attractive as possible, the marketplace applications 30 may include one or more imaging applications 56 with which users may upload images (e.g., thumbnail images) for inclusion within listings. An imaging application 56 also operates to incorporate images (e.g., thumbnail images) within viewed listings. The imaging applications 56 may also support one or more promotional features, such as image galleries that are presented to potential buyers. For example, sellers may pay an additional fee to have an image included within a gallery of images for promoted items.

Listing creation applications 58 allow sellers to conveniently author listings pertaining to goods or services that they wish to transact via the network-based marketplace 12, while the listing management applications 60 allow sellers to manage such listings. Specifically, where a particular seller has authored and/or published a large number of listings, the management of such listings may present a challenge. The listing creation applications 58 may further facilitate a buyer watching specific listings or specific types of listings. The listing management applications 60 provide a number of features (e.g., auto-relisting, inventory level monitors, etc.) to assist the seller in managing such listings.

One or more post-listing management applications 62 may also assist sellers with a number of activities that may typically occur post-listing. For example, upon completion of an auction facilitated by one or more auction applications 42, a seller may wish to leave feedback regarding a particular buyer. To this end, a post-listing management application 62 may provide an interface to one or more reputation applications 48, so as to allow the seller conveniently to provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the network-based marketplace 12.

Messaging applications 68 are responsible for the generation and delivery of messages to users of the network-based marketplace 12, with such messages, for example, advising users regarding the status of listings at the network-based marketplace 12 (e.g., providing "outbid" notices to bidders during an auction process or to providing promotional and merchandising information to users). Respective messaging applications 68 may utilize any one of a number of message delivery networks and platforms to deliver messages to users. For example, messaging applications 68 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX-IEEE 802.16) networks.

Merchandising applications 70 support various merchandising functions that are made available to sellers to enable sellers to increase sales via the network-based marketplace 12. The merchandising applications 70 also operate the various merchandising features that may be invoked by sellers and may monitor and track the success of merchandising strategies employed by sellers. In addition, the user may utilize the transaction incentivizing applications 72 to select one or more criterion that may be used to generate a social goodness index that is used to generate a badge.

The Feed Applications 74 may facilitate feed in the network-based marketplace as described throughout this document. The Feed Applications 74 may include the receive module 21, process module 23 and communication module 25.

Data Structures

Figure 4A:
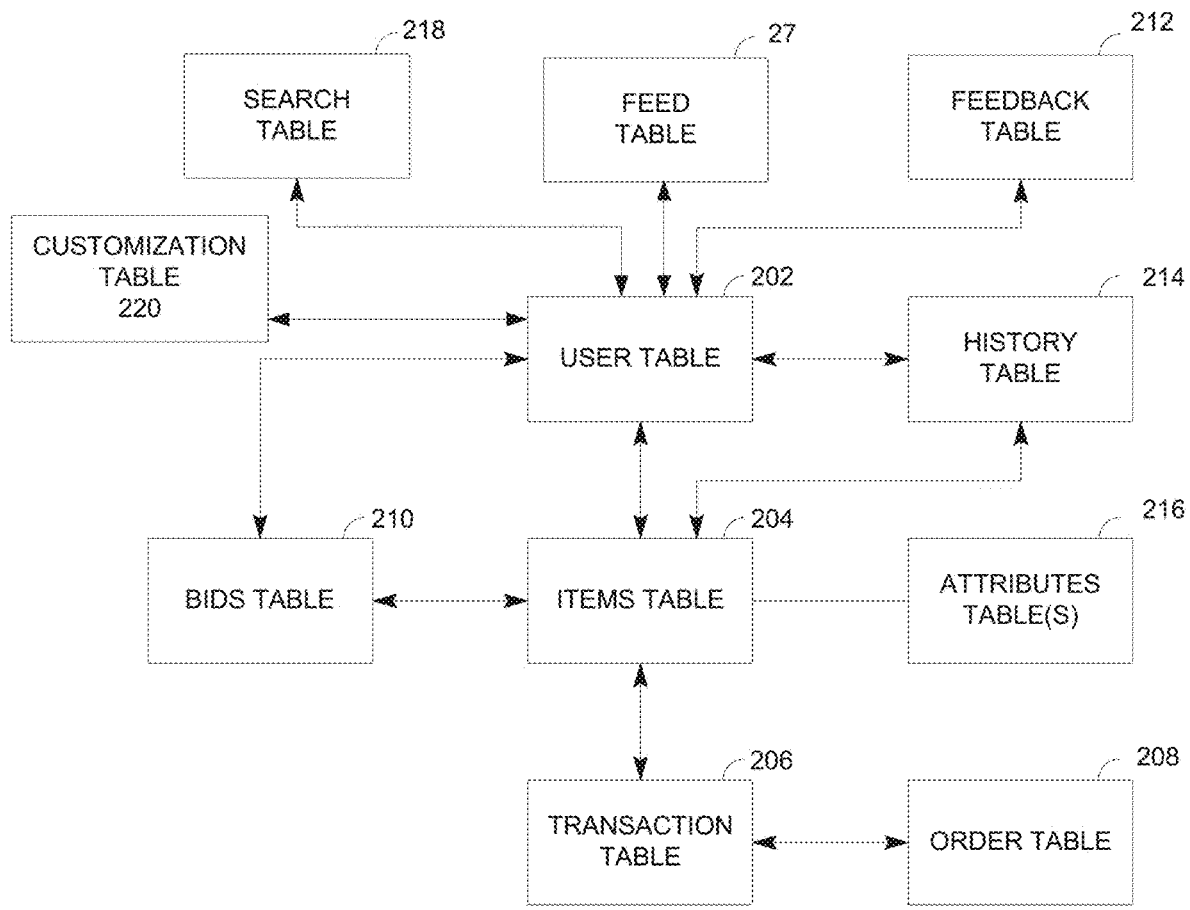
FIG. 4A is a block diagram illustrating tables, according to an embodiment.

FIG. 4A is a high-level entity-relationship diagram, illustrating various tables 200 that may be maintained within the databases 36 of FIG. 2, and that are utilized by and support the marketplace applications 30 and payment applications 32 both of FIG. 3. A user table 202 contains a record for registered users of the network-based marketplace 12 of FIG. 2. A user may operate as a seller, a buyer, or both, within the network-based marketplace 12. In one example embodiment, a buyer may be a user that has accumulated value (e.g., commercial or proprietary currency), and is accordingly able to exchange the accumulated value for items that are offered for sale by the network-based marketplace 12.

The tables 200 also include an items table 204 in which item records (e.g., listings) are maintained for goods and services that are available to be, or have been, transacted via the network-based marketplace 12. Item records (e.g., listings) within the items table 204 may furthermore be linked to one or more user records within the user table 202, so as to associate a seller and one or more actual or potential buyers with an item record (e.g., listing).

A transaction table 206 may contain a record for each transaction (e.g., a purchase or sale transaction or auction) pertaining to items for which records exist within the items table 204.

An order table 208 may be populated with order records, with each order record being associated with an order. Each order, in turn, may be associated with one or more transactions for which records exist within the transaction table 206.

Bid records within a bids table 210 may relate to a bid received at the network-based marketplace 12 in connection with an auction-format listing supported by an auction application 42 of FIG. 3. A feedback table 212 is utilized by one or more reputation applications 48 of FIG. 3, in one example embodiment, to construct and maintain reputation information concerning users in the form of a feedback score. A history table 214 may maintain a history of transactions to which a user has been a party. One or more attributes tables 216 may record attribute information that pertain to items for which records exist within the items table 204. Considering only a single example of such an attribute, the attributes tables 216 may indicate a currency attribute associated with a particular item, with the currency attribute identifying the currency of a price for the relevant item as specified in by a seller.

A search table 218 may store search information that has been entered by a user (e.g., buyer) who is looking for a specific type of listing. A customization table 220 may store customization information for incentivizing transactions that enhance social goodness.

A feed table 27 may facilitate the generation and presentation of a real time continuously generated feed in the network-based marketplace 12.

Figure 4B:
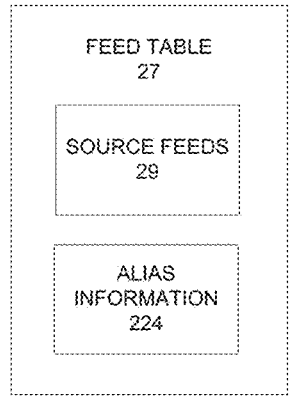
FIG. 4B is a block diagram illustrating a feed table, according to an embodiment.

FIG. 4B is a block diagram illustrating a feed table 27, according to an embodiment. The feed table 27 may include source feeds 29 that are utilized to generate the presentation feed 31 as shown in FIG. 1 and alias information 224 that is utilized to identify source feeds 29, as described further below.

Figure 4C:
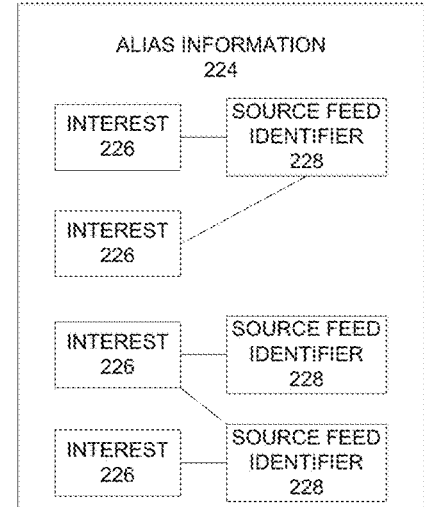
FIG. 4C is a block diagram illustrating source feed information, according to an embodiment.

FIG. 4C is a block diagram illustrating alias information 224, according to an embodiment. The alias information 224 may include interests 226 that are associated with source feed identifiers 228 that may be utilized to identify one or more of the source feeds 29. A user may identify an interest 226 (e.g., guitars) in the form of a selection that is received by the network-based marketplace 12. The network-based marketplace 12 may associate the selection to one or more source feed identifier 228 that are, in turn, utilized to identify one or more source feeds 29 that are, in turn, utilized to identify content elements 15 that are utilized to generate the presentation feed 31.

Figure 5A:
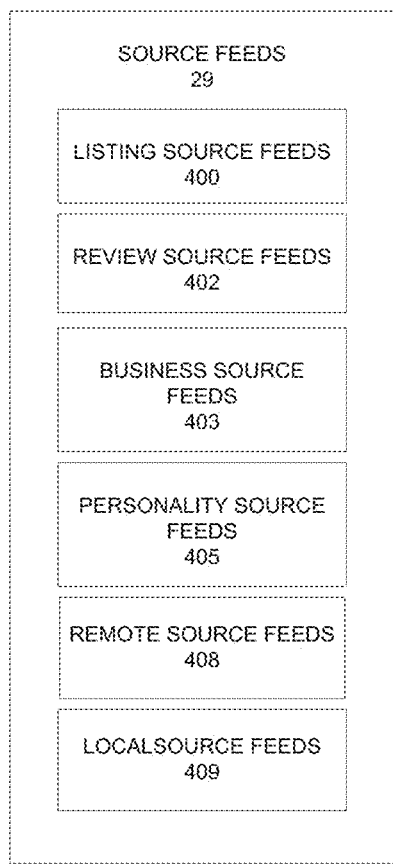
FIG. 5A is a block diagram illustrating source feeds, according to an embodiment.

FIG. 5A is a block diagram illustrating source feeds 29, according to an embodiment. The source feeds 29 may be utilized by the network-based marketplace 12 to generate presentation feeds 31. Each of the source feeds 29 may include different types of content elements 15, as shown in FIG. 1. The source feeds 29 may include listing source feeds 400, review source feeds 402, business source feeds 403, personality source feeds 405, remote source feeds 408 and local source feeds 409. The listing source feeds 400, review source feeds 402, business source feeds 403, and personality source feeds 405 are described further below.

The remote source feeds 408 may include remote feed identifiers that identify content elements 15 and other information for retrieval from a remote server. For example, the remote source feed 408 may include remote feed identifiers that are utilized to identify source feeds 29, content elements 15 and the third party server machines 41 (e.g., social networking web site) where the source feeds 29 and the content elements 15 are located. In another instance, the remote feed identifiers may identify source feeds 29, content elements 15 and the third party server machines 41 (e.g., social networking web site) where the source feeds 29 and the content elements 15 are located at the third party server machines 41 based on a "friend" status that is shared by the user and another user.

The local source feeds 409 may include content elements 15 that are generated based on information that is related to the network-based marketplace 12. For example, the local source feeds 409 may include content elements 15 that are generated based on service announcements and business announcements that are authored by the network-based marketplace 12.

Figure 5B:
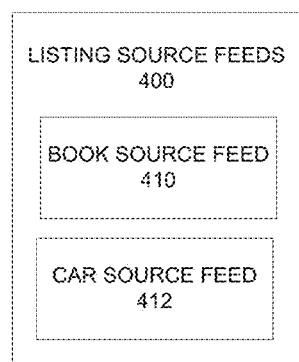
FIG. 5B is a block diagram illustrating listing source feeds, according to an embodiment.

FIG. 5B is a block diagram illustrating listing source feeds 400, according to an embodiment. The listing source feeds 400 may include content elements 15 that were generated from listings that describe items (e.g., goods or services) for sale on the network-based marketplace 12. Each content element 15 may present a single listing 300 that may describe one item or a lot of items. The listing source feeds 400 may be differentiated based on the type of item that is described in a listing 300. Merely for example the listing source feeds 400 are shown to illustrate a book source feed 410 that includes content elements 15 that were generated from listings that describe books and a car source feed 412 that includes content elements 15 that were generated from listings that describe cars. Other listing source feeds 400 for other types of items may be included in the source feeds 29. In one embodiment, the listing source feeds 400 may correspond to categories on the network-based marketplace 12. In another embodiment the listing source feeds 400 may approximately correspond to the categories on the network-based marketplace 12.

Figure 5C:
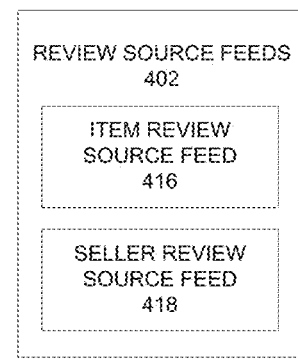
FIG. 5C is a block diagram illustrating review source feeds, according to an embodiment.

FIG. 5C is a block diagram illustrating review source feeds 402, according to an embodiment. The review source feeds 402 may include an item review source feed 416 that includes content elements 15 that were generated from reviews of items that are being offered for sale that are described in listings on the network-based marketplace, a seller review source feed 418 that includes content elements 15 that were generated from reviews of sellers that are selling items that are described in listings on the network-based marketplace 12.

Figure 5D:
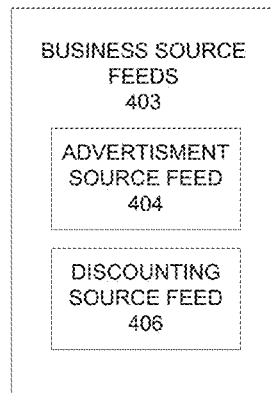
FIG. 5D is a block diagram illustrating business source feeds, according to an embodiment.

FIG. 5D is a block diagram illustrating business source feeds 403, according to an embodiment. The business source feeds 403 may include an advertisement source feed 404 and a discounting source feed 406. The advertisement source feed 404 may include content elements 15 that were generated from advertisements of products or services. In one instance the content elements 15 may describe products or services that are being offered for sale in listings 300 on the network-based marketplace 12. The discounting source feed 406 may include content elements 15 that were generated from discounts on products or services. In one instance, the content elements 15 may be generated for products or services that are being offered for sale in listings 300 on the network-based marketplace 12.

Figure 5E:
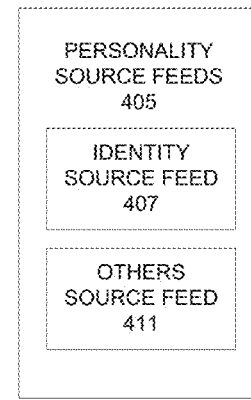
FIG. 5E is a block diagram illustrating personality source feeds, according to an embodiment.

FIG. 5E is a block diagram illustrating personality source feeds 405, according to an embodiment. The personality source feeds 405 may include an identity source feed 407 and an others source feeds 411. The identity source feed 407 may include content elements 15 that were generated based on the identity of the user. In one instance the content elements 15 may be generated based on one or more selections that were received from the user by the network-based marketplace 12. In another instance the content elements 15 may be generated based on the present location of the user. In another instance the content elements 15 may be generated based on an inventory that is identified by the user (e.g., a collection of listings 300).

The others source feed 411 may include content elements 15 that were generated based on the identity of other users. In one instance the content elements 15 may be generated based on one or more selections that were received from the other user by the network-based marketplace 12. In another instance the content elements 15 may be generated based on the present location of the other user. In another instance the content elements 15 may be generated based on an inventory that is identified by the other user (e.g., a collection of listings 300).

Figure 5F:
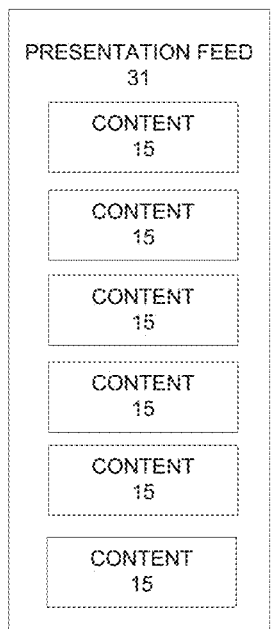
FIG. 5F is a block diagram illustrating a presentation feed, according to an embodiment.

FIG. 5F is a block diagram illustrating a presentation feed 31, according to an embodiment. The presentation feed 31 may include content elements 15 that are retrieved from one or more source feeds 29 or other sources of content elements 15.

Figure 5G:
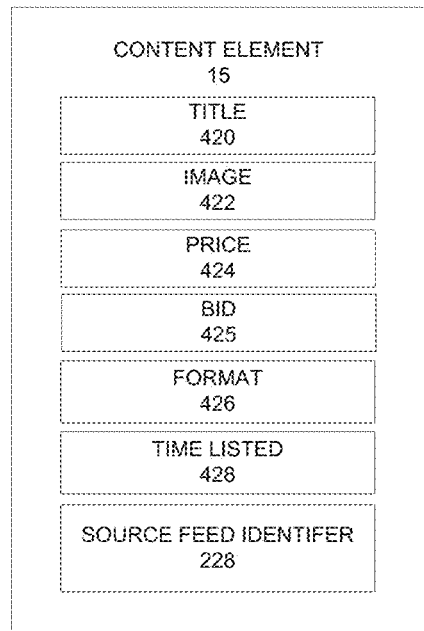
FIG. 5G is a block diagram illustrating a content element, according to an embodiment.

FIG. 5G is a block diagram illustrating content element 15, according to an embodiment. The content element 15 that is illustrated may be generated based on a listing that describes an item for sale on the network-based marketplace 12. For example the content element 15 may include a title 420, an image 422, a price 424, a highest bid in an auction, a format 426 that may identify fixed-price listing formats (e.g., the traditional classified advertisement-type listing or a catalogue listing) and buyout-type listings as described above, a time listed 428 that describes the time the item was listed on the network-based marketplace 12 and a source feed identifier 228 that identifies that source feed 29 from which the content element 15 was retrieved. The content element 15 may be generated from any source and is not limited to a listing.

Figure 6A:
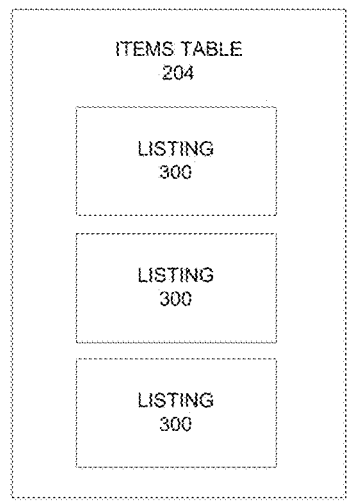
FIG. 6A is a block diagram illustrating an items table, according to an embodiment.

FIG. 6A is a block diagram illustrating an items table 204, according to an embodiment. The items table 204 may include listings 300 that describe items (e.g., goods or services) that are being offered for sale on the network based marketplace 12.

Figure 6B:
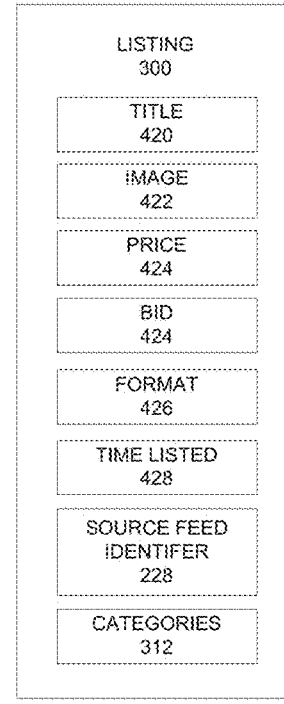
FIG. 6B is a block diagram illustrating a listing, according to an embodiment.

FIG. 6B is a block diagram illustrating a listing 300, according to an embodiment. The listing 300 may include a title 420, an image 422, a price 424, a highest bid in an auction, a format 426, and a source feed identifier 228 as described in FIG. 15. The listing 300 may further include categories 312 in which the listing 300 may be identified by browsing a hierarchy of categories on the network-based marketplace 12.

Figure 6C:
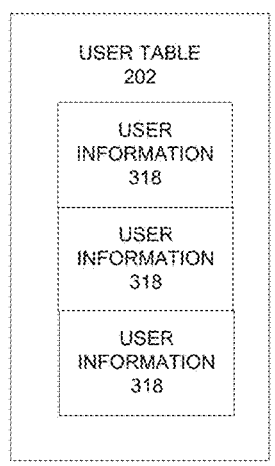
FIG. 6C is a block diagram illustrating user table, according to an embodiment.

FIG. 6C is a block diagram illustrating a user table 202, according to an embodiment. The user table 202 may include user information 318 for each user on the network-based marketplace 12 that describes the respective users.

Figure 6D:
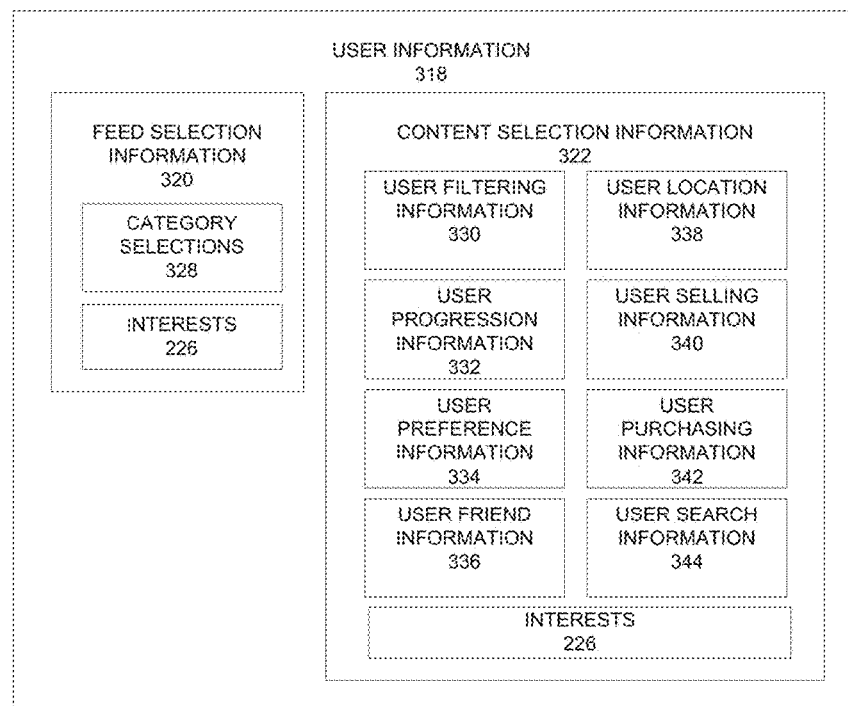
FIG. 6D is a block diagram illustrating user information, according to an embodiment.

FIG. 6D is a block diagram illustrating user information 318, according to an embodiment. The user information 318 may include feed selection information 320 and content selection information 322. The feed selection information 320 may be utilized to identify source feeds 29 for the user. The feed selection information 320 may include category selections 328 identified by the user and interests 226 identified by the user. The feed selection information 320 may be used to identify, in real-time, source feeds 29 that are used to generate the presentation feed 31 associated with the user. The category selections 328 may identify recent category selections of the user that have been received by the network-based marketplace 12. The interests 226 may be received by the network-based marketplace 12 and utilized by the network-based marketplace 12 to identify source feeds 29 based on the alias information 224 as shown in FIG. 4C. The interests 226 may be identified based on selections of the user that are received by the network-based marketplace or one or more behaviours of the user that are identified by the network-based marketplace 12 where a particular behaviour is defined by a set of selections.

The content selection information 322 may be used to identify content elements 15. In one instance the content selection information 322 may be used to identify content elements 15 for retrieval from one or more source feeds 29. In another instance the content selection information 322 may be used to identify content elements 15 for retrieval from a source other than the source feeds 29. The content selection information 322 may include user filtering information 330, user progression information 332, user preference information 334, user friend information 336, user location information 338, user selling information 340, user purchasing information 342, user search information 344, and interests 226. The user filtering information 330 may be utilized to filter content elements 15. For example, the user may be provided an option to exclude content elements 15 from the presentation feed 31. In one instance the user may provide keywords that are received by the network-based marketplace 12 and used to exclude matching content elements 15 from the presentation feed 31. In one instance, the keywords may be conceptualized. For example, the keywords "Batman Returns DVD" (in category "movies") may be conceptualized to "Batman" and used to filter content elements 15 that describe items related to "Batman" (in other categories such as "Toys", "Clothing", etc.) from the presentation feed 31. Further, the content element 15 may be excluded from the presentation feed 31 based on user behaviour that is detected by the network-based marketplace 12. For example, if a user only buys items made in the USA, the presentation feed 31 may be filtered to only include those items. Further, if a user avoids a certain brand of items then that brand of items may be removed from the presentation feed 31. Further, content elements 15 may be filtered based on an amount of money available in a financial account of the user such as banking account or a PayPal account. For example, content items 15 that are generated from listings 300 of items that include a price or a minimum bid above that amount of money available in the financial account of the user may be filtered. The user progression information 332 may be utilized to identify content elements 15 in the source feeds 29 based on a progression of an entity that is associated with the user. An entity may include a person, place or a thing. A progression of a person may include the selection of content elements 15 that are age appropriate for the person (e.g., baby, teenager, adult, etc.). A progression of a place may include the selection of content elements 15 that are appropriate for the passing of time associated with the place. For example, content elements 15 may be selected based on a season (e.g., Winter, Spring, Summer, Fall) in association with places including parks, theatres, and performing forums. A progression of a thing may include the selection of content elements 15 that are appropriate for the passing of time associated with the thing. For example, the content element 15 may be selected based on the present date and the maintenance schedule for a car, appliance, or bill payment.

The user preference information 334 may be utilized to identify content elements 15 based on preferences that are indicated by the user. In one instance the user preference information 334 may be utilized to identify content elements 15 in the source feeds 29 based on preferences that are received by the network-based marketplace 12 from the user. In one instance the user may express the preference in the form of keywords that are received by the network-based marketplace 12. In one embodiment, the keywords may be conceptualized to identify additional content elements 15. For example, the keywords "Oz DVD" (in category "movies") may be conceptualized to "Oz" and used to add content elements 15 related to "Oz" (in other categories such as "Toys", "Clothing", etc.) to the presentation feed 31. Further, additional weight may be given to content elements 15 that relate to items that the user repeatedly interacts with or purchases on the network-based marketplace 12. The user friend information 336 may be utilized to identify content elements 15 based on a "friend" of the user on the network-based marketplace 12 or a third party server machine 41 (e.g., social networking web site). The user location information 338 may be utilized to identify content elements 15 based on the present location of the user. For example, the network-based marketplace 12 may identify content elements 15 in one or more source feeds 29 that describe items for sale by bricks and mortar stores based on the location of the user. Further, the selection of content elements 15 based on the location of the user may further be refined based on the time of day or local weather. The user selling information 340 may be utilized to identify content elements 15 in the source feeds 29 based on the selling patterns of the user. For example, a user who sells a quantity of a type of item over a predetermined threshold may trigger an identification of content elements 15 that describe or are related to the type of item. The user purchasing information 342 may be utilized to identify content element 15 based on the purchasing patterns of the user. For example, a user who buys a quantity of a type of items over a predetermined threshold may trigger an identification of content elements 15 in source feeds 29 based on the type of items. The user search information 344 may be utilized to identify content elements 15 based on the searches entered by the user and received by the network-based marketplace 12.

FIG. 7A is a block diagram illustrating a method 450, according to an embodiment, to facilitate feed in a network-based marketplace. Illustrated on the left is a client machine 19 and illustrated on the right is the network-based marketplace 12. The method 450 may commence at operation 452 with the client machine 19 communicating a request to the network-based marketplace 12.

At the network-based marketplace 12, at operation 454, the receive module 21 may receive the request and associated the request with a user identifier. At operation 456 the process module 23 may identify source feeds 29 and content elements 15 in the source feeds. For example, the process module 23 may utilize the user identifier to identify user information 318 in the user table 202 that includes the feed selection information 320 and the content selection information 322. Next the process module 23 may utilize the feed selection information 320 to identify source feeds 29.

At operation 458, the process module 23 may generate the presentation feed 31 based on the source feeds 458 and the content selection information 320. For example, the process module 23 may identify the content elements 15 in the source feeds 29 based on the content selection information 322 and add the content elements 15 that were identified to the presentation feed 31. Further, the process module 23 may identify content elements 15 that are not in a source feed 29 based on the content selection information 320 and add the content elements 15 that were identified to the presentation feed 31. At operation 460 the process module 23 may segment the presentation feed into pages 33. For example, the pages 33 may correspond to a quantity of content elements 15 that may be displayed on a single screen of a device (e.g., desktop monitor, mobile device, etc.) At operation 462, the process module 23 may generate interfaces 35 based on the pages 33. For example, the process module 23 may generate a user interface including user interface elements or a machine interface based on machine interface elements. At operation 464, the process module 23 may set a timeout. At operation 468, the communication module 25 may communicate the interface 35 (e.g., user interface) over the network 14 to the client machine 19.

At the client machine 19, at operation 470, the client machine 19 may receive and display the interface 35. At operation 472, the client machine 19 may receive a prompt from the user for the next interface 35 of content element 15 and communicate the prompt to the network-based marketplace 12.

At the network-based marketplace 12, at operation 468, the communication module 25 may communicate the next interface 35 (e.g., user interface) to the client machine 19.

At operation "A," responsive to the expiration of the timeout, the operations 458, 460, 462 and 464 are performed again. In this manner the presentation feed 31 is continuously generated in real-time until the process is interrupted. For example, the presentation feed 31 may operate as a continuously generated first-in, first-out buffer until the user interrupts the process.

FIG. 7B is a block diagram illustrating a method 480, according to an embodiment, to add or remove an interest 226. Illustrated on the left is a client machine 19 and illustrated on the right is the network-based marketplace 12. The method 480 may commence at operation 482 with the client machine 19 communicating a request to the network-based marketplace 12. For example, the request may include an interest identifier, a user identifier, and a command to add or remove the interest 226.

At the network-based marketplace 12, at operation 484, the receive module 21 may receive the request from the user. At operation 486 the process module 23 may add or remove the interest 226 for the user. For example, the process module 23 may identify the appropriate user information 318 based on the user identifier and add the interest 226 to the feed selection information 320 and the content selection information 322 based on a command that adds the interest or remove the interest 226 from the feed selection information 320 and the content selection information 322 based on a command that removes the interest.

Figure 8:
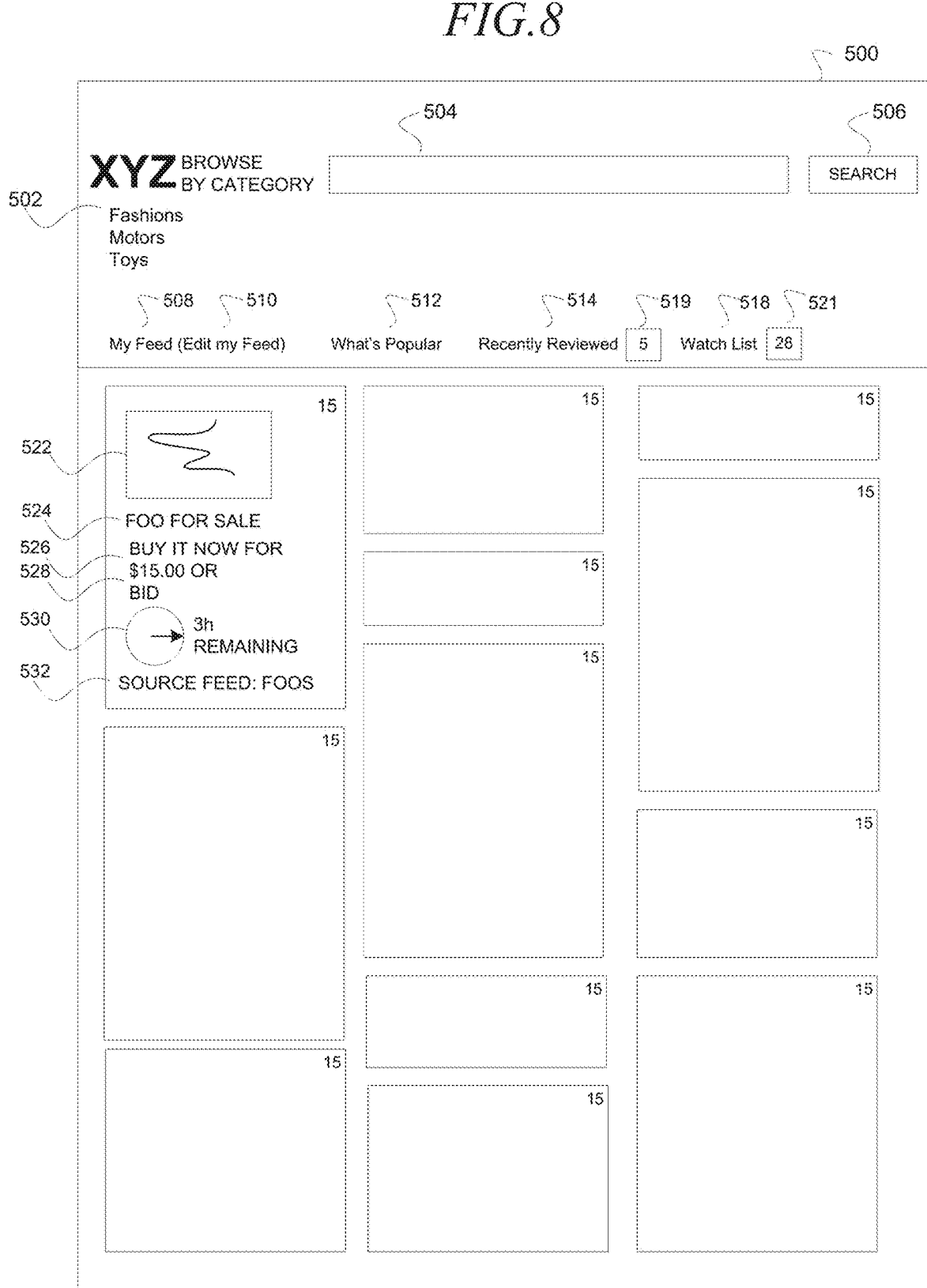
FIG. 8 is a diagram of a "My Feed" user interface, according to an embodiment.

FIG. 8 is a diagram of a "My Feed" user interface 500, according to an embodiment. "My Feed" user interface 500 may be generated according to method 450 illustrated in FIG. 7. The "My Feed" user interface 500 may support browse by category selections 502 and include an input box 504 to enter keywords to search for items on the network-based marketplace 12. The keywords may be received by the network-based marketplace responsive the receipt of the selection of the search button 506. The "My Feed" user interface 500, near the top, is further shown to include a set of controls 508-518 that are illustrated horizontally across the interface in a row. Below the controls, the "My Feed" user interface 500 may include a body of content elements 15. The controls may include a "My Feed" control 508, an "Edit my Feed" control 510, a "What's Popular" control 512, a "Recently Reviewed" control 514 and a "Watch List" control 518. Each of the respective controls may be selected to advance to the identified user interface, as is described below. The "Recently Reviewed" control 514 is associated with a count 519 that identifies the number of content elements 15 on the "Recently Reviewed" user interface and the "Watch List" control 518 is associated with a count 521 that identifies the number of content element 15 elements on the "Watch List" user interface. The body of the user interface 500 includes content elements 15. The illustrated content element 15 is for a listing 300 and is shown to include an image 522, a title 524, a price for purchase 526, a prompt for bid 528, time remaining 530 for the item to remain on sale for purchase or auction and a feed name 532 that is associated with a source feed identifier 228.

Figure 9:
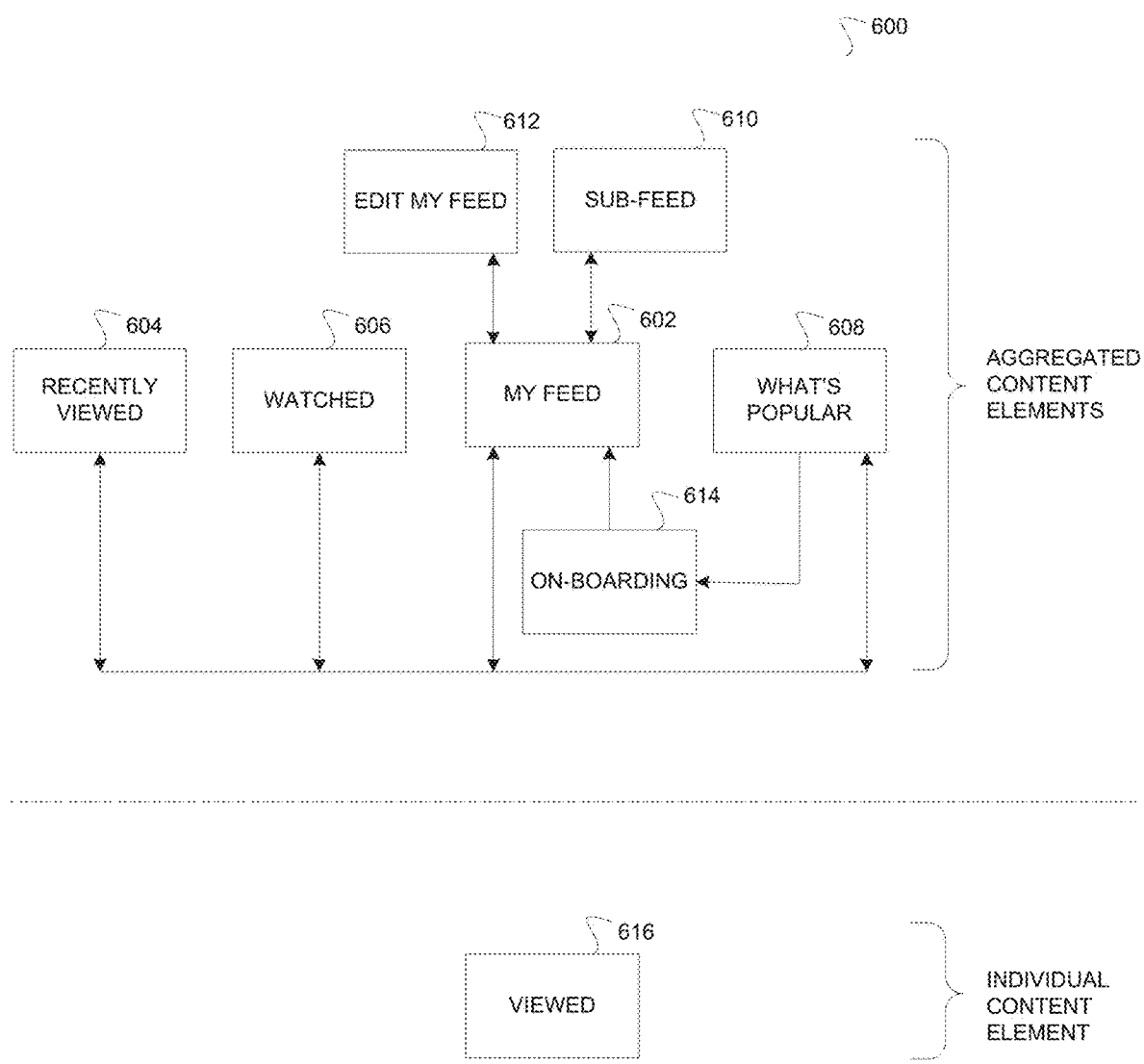
FIG. 9 is a diagram of a site map, according to an embodiment.

FIG. 9 is a diagram of a site map 600, according to an embodiment, to facilitate feed on a network-based marketplace. The site map 600 may include an "Edit My Feed" interface 612, a "Sub-Feed" interface 610, a "Recently Viewed" interface 604, a "Watched" interface 606, a "My Feed" interface 602, a "What's Popular" interface 608 and an "On-Boarding" interface 614. Each of the interfaces may display an aggregation of content elements 15. The arrows indicate paths that may be navigated by the user to move from one interface to another. The "Recently Viewed" interface 604, "Watched" interface 606, "My Feed" interface 602, and "What's Popular" interface 608 may transition to each other. A "Viewed" interface 616 is further illustrated and is utilized to view a single content element 15. The "Viewed" interface 616 may be entered from any of the interfaces 602, 604, 606, 608, 610, 612, 614.

"My Feed"

The "My Feed" interface 602 facilitates the presentation of content elements 15 to the user and may be configured by the user. The "My Feed" interface 602 corresponds to the "My Feed" user interface 500 in FIG. 8 and, accordingly, the same or similar references have been used to indicate the same or similar features unless otherwise indicated. The "My Feed" interface 602 is one form of the interface 35 disclosed in this document. In one instance, the "My Feed" interface 602 may be the homepage of the user. In other instances, the "My Feed" interface 602 may be entered from the "Edit My Feed" interface 612, the "Sub-Feed" interface 610, the "On-Boarding" interface 614, the "What's Popular" interface 608, the "Watched" interface 606, and the "Recently Viewed" interface 604.

The user may interact with the content elements 15 that were generated from listings 300 on the "My Feed" interface 602. Responsive to a hover over of a content element 15 that was generated from a listing 300, the user may be presented with selectable actions to: (A) watch an item that is described by a listing 300, or (B) remove an item that is described by a listing 300. Responsive to the user selecting the title 420 or image 422 of a content element 15 that was generated from a listing 300 the user may be presented with a single item in the "Viewed" layer 616 that provides additional details about the item. Responsive to the user selecting the feed name 532 the user is presented with the "Sub Feed" interface 610.

The "My Feed" interface 602 may be infinitely scrolled, meaning that as the user scrolls down the interface 602, the process module 23 continues to retrieve content elements 15 from the source feeds 29 and generate the presentation feed 31. Further, the network-based marketplace 12 may continuously identify items that are described by listings 300 that are presently becoming available (e.g., new listing, new offer for sale, etc.) and that match the feed selection information 320 and the content selection information 322 associated with the user. Responsive to an identification of content elements 15 that are new, a "new discoveries" interface element may be displayed on the top of the "My Feed" interface 602 with a count of the newly matching items that are now available for the user to view in the "My Feed" interface 602. Selection of the interface element may move the user to the top of the "My Feed" interface 602 where the new items are displayed in the form of content elements 15 that are faded to facilitate detection by the user.

"What's Popular"

The "What's Popular" interface 608 may include content elements 15 that are identified as popular on the network-based marketplace 12. The "What's Popular" interface 608 may be generated with the method 450, as illustrated in FIG. 7, where the method 450 is altered by using only the business source feeds 403, the local source feeds 409 and source feeds 29 that include content elements 15 that depict listings 300 of items that are identified as popular in the network-based marketplace 12. In one instance the content elements 15 may be selected based on searches that are identified as popular on the network-based marketplace 12. In one instance the content elements 15 may be selected based on category selections 328 and interests 226 that are associated with the user. The "What's Popular" interface 608 is one form of the interface 35.

The user may interact with the content elements 15 on the "What's Popular" interface 608. Responsive to a hover over of a content element 15 that was generated from a listing 300, the user may be presented with selectable actions to: (A) watch an item that is described by a listing 300, or (B) remove an item that is described by a listing 300. Responsive to the user selecting the title 420 or image 422 of a content element 15 that was generated from a listing 300 the user may be presented with a single item in the "Viewed" layer 616 that provides additional details about the item. Responsive to the user selecting the feed name 532 the user is presented with the "Sub Feed" interface 610.

The "What's Popular" interface 608 may be infinitely scrolled, as described above responsive to identifying the user has already created a feed (e.g., My Feed). Otherwise, the "What's Popular" interface 608 may be blocked at a bottom where the user is prompted to create their own feed.

"Recently Viewed"

The "Recently Viewed" interface 604 includes content elements 15 that depict listings 300 of items the user has recently viewed in previous sessions. The "Recently Viewed" interface 604 may be generated with the method 450, as illustrated in FIG. 7, where the method 450 is altered by using only the business source feeds 403, the local source feeds 409 and a source feed 29 that includes content elements 15 that depict listings 300 of items the user has recently viewed in previous sessions. The "My Feed" interface 602 is one form of the interface 35.

"Watched"

The "Watched" interface 606 may include content elements 15 that depict listings 300 of items the user has added to their watch list. The "Watched" interface 606 may be generated with the method 450, as illustrated in FIG. 7, where the method 450 is altered by using only the business source feeds 403, the local source feeds 409 and a source feed 29 that includes content elements 15 that depict listings 300 of items the user has viewed in recent sessions. The "My Feed" interface 602 is one form of the interface 35. The "Watched" interface 606 may be utilized by the user to view the current price/current bid and other details of items. Further, the user may receive emails when the status of a listing 300 changes.

"Edit My Feed"

The "Edit My Feed" interface 612 facilitates the monitoring, addition and removal of interests 226. For example, the "Edit My Feed" interface 612 may present multiple interests 226 that are presently being followed by the user. The user may elect to remove the interest 226 or do nothing and continue to follow the interest. In another instance, the user may enter keywords that may be received by the receive module 21 and the process module 23 may associate the keyword to interests 226 that are identified as added (e.g. being followed). In another instance the user may connect with a third party application 43 on a third party server machine 41 (e.g., Facebook, Pinterest, etc.) to retrieve interests 226 for following by the user. For example, the user may login to the third party server machine 41 and request the third party application 43 on the third party server machine 41 to "share" the interests 226 of the user with the network-based marketplace 12 or to "share" the interests 226 of a "friend" of the user with the network-based marketplace 12. The interests 226 that area added with the "Edit My Feed" interface 612 may be stored as feed selection information 320 and content selection information 322.

"Sub-Feed"

The "Sub-Feed" interface 610 includes content elements 15 from one source feed 29. The "Sub-Feed" interface 610 is generated with the method 450, as illustrated in FIG. 7, where the method 450 may be altered by using only the business source feeds 403, the local source feeds 409 and a source feed 29 that is identified by the user. The "Sub-Feed" interface 610 is one form of the interface 35. The "Sub-Feed" interface 610 may be entered responsive to the user selecting the source feed name 532 of a content element 15 as it appears on the "My Feed" interface 602. The "Sub-Feed" interface 610 may also be entered responsive to the user selecting an interface element associated with an interest 226 as it appears on the "Edit My Feed" interface 612.

"On-Boarding"

The "On-Boarding" interfaces 614 facilitate a user to initially configure presentation feed 31 (e.g., "My Feed"). The "On-Boarding" interfaces 614 may enable the network-based marketplace 12 to receive selections from the user that identify source feeds 29 and interests 226. In one instance the network-based marketplace 12 may suggest source feeds 29 to the user based on searches that have been entered by the user and searches that have been saved by the user. In another instance the network-based marketplace 12 may communicate an input box in which the user may enter keywords that are received by the network-based marketplace 12 and associated with interests 226 that the user may then select by selecting a "Follow" interface element that is associated with the user. In one instance the user must select a minimum number of source feeds 29 before the users feed is configured. In another instance the user may connect with a third party application 43 on a third party server machine 41 (e.g., Facebook, Pinterest, etc.) to retrieve interests 226 that may then be selected for following. For example, the user may login to the third party server machine 41 and request the third party application 43 on the third party server machine 41 to "share" the interests of the user with the network-based marketplace 12.

"Viewed"

The "Viewed" interface 616 may include a single content element 15 that depicts a listing 300. The "Viewed" interface 616 may be entered by selecting the title 420 or the image 422 of a content element 15 of a listing 300 from any of the above identified interfaces 35. The "Viewed" interface 616 may provide additional information for the item. For example, the "Viewed" interface 616 may enable the user to purchase the item or enter a bid that wins an auction. In one instance the Viewed" interface 616 may enable the user to share the item with third party application 43 on a third party server machine 41 (e.g., Facebook, Pinterest, Twitter, email, etc.).

Other Interfaces

The term "interface 35," as used in this document, may include the "Edit My Feed" interface 612, the "Sub-Feed" interface 610, the "Recently Viewed" interface 604, the "Watched" interface 606, the "My Feed" interface 602, the "What's Popular" interface 608, the "On-Boarding" interface 614 and the "Viewed" interface 616. It will be appreciated by one having ordinary skill in the art that the term "interface 35" may also include other types of interfaces including more specialized interfaces. Accordingly, the functionality that is enabled by the above described interfaces 602, 604, 606, 608, 610, 612, 614 and 616 may be embodied as a user interface including user interface elements, a machine interface including machine interface elements, an audio interface including audio interface elements, a kinetic interface including kinetic interface elements, and other types of interfaces 35.

Figure 10:
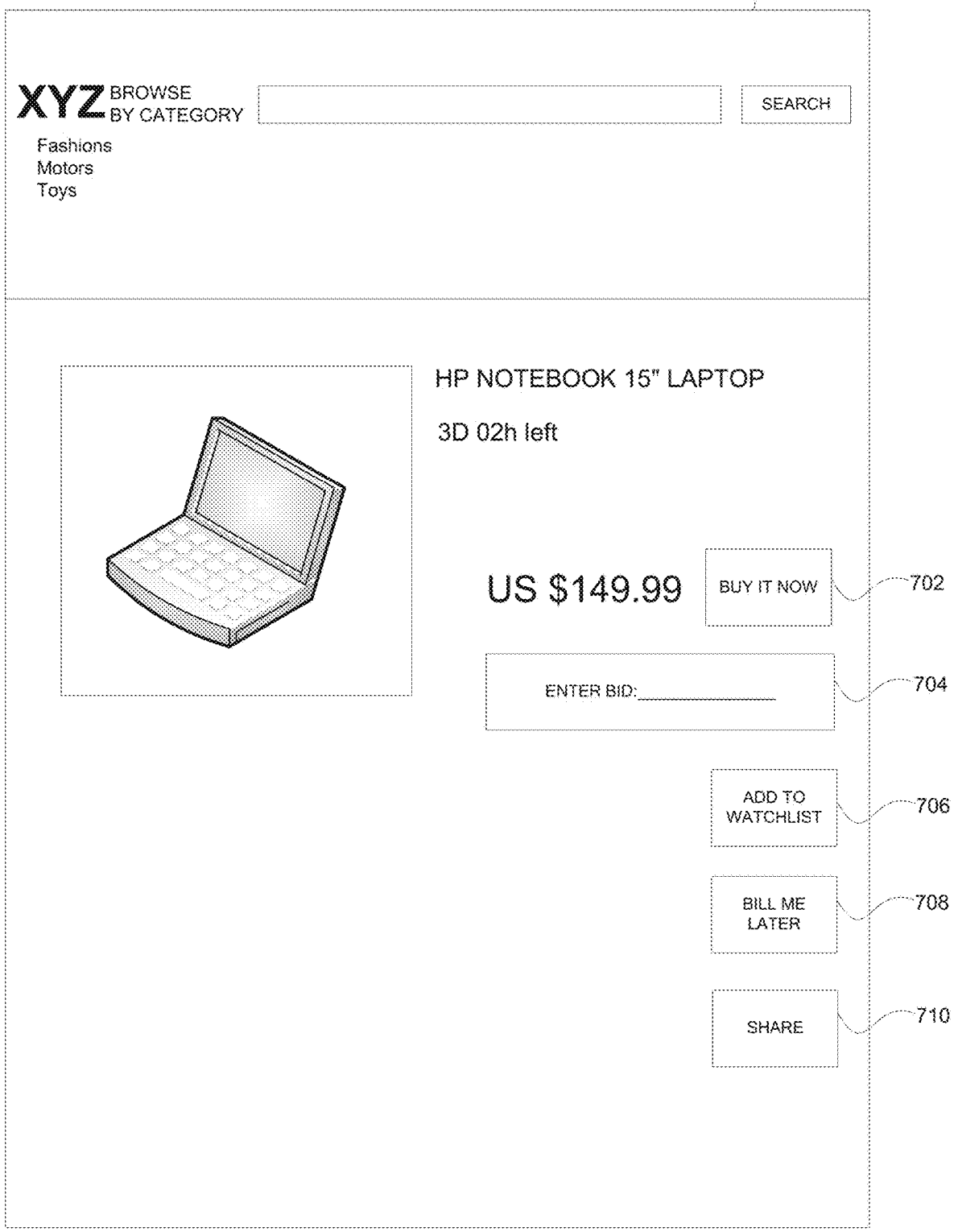
FIG. 10 is a diagram of a "Viewed" user interface, according to in embodiment.

FIG. 10 is a diagram of a "Viewed" user interface 700, according to an embodiment. The "Viewed" user interface 700 corresponds to the "Viewed" interface 616 in FIG. 9 and, accordingly, the same or similar references have been used to indicate the same or similar features unless otherwise indicated. The "Viewed" user interface 700 may be displayed on the client machine 5 and depict a listing 300 of an item that is for sale on the network-based marketplace 12. The "Viewed" user interface 700 may be entered by selecting the title or image of a content element 15 that is generated from a listing 300 on the network-based marketplace 12. The "Viewed" user interface 700 may include a user interface elements 702, 706, 708 and 710 that may be selected by the user and a user input box 704 to facilitate entry of a bid by the user. Responsive to a user selection of the user interface element 702, the receive module 21 may receive the selection and the fixed-price applications 44 may process the selection to purchase the item (e.g., laptop) for the user. Responsive to a user entering and submitting a bid in the user input box 704, the receive module 21 may receive the bid and the auction applications 42 applications 58 may enter the bid in the auction that may result in the user winning the auction. Responsive to a user selection of the user interface element 706, the receive module 21 may receive the selection and the listing creation applications 58 may process the selection to establish a watch of the item (e.g., laptop) for the user. Responsive to a user selection of the user interface element 708, the receive module 21 may receive the selection and the payment applications 32 may process the selection to provide financing for purchasing the item or winning the item in an auction. Responsive to a user selection of the user interface element 710, the receive module 21 may receive the selection and the network-based marketplace 12 may process the selection to share the listing 300 with a third party application 43 that is hosted an a third party server machine 41 (e.g., Facebook, Twitter, etc.).

Figure 11:
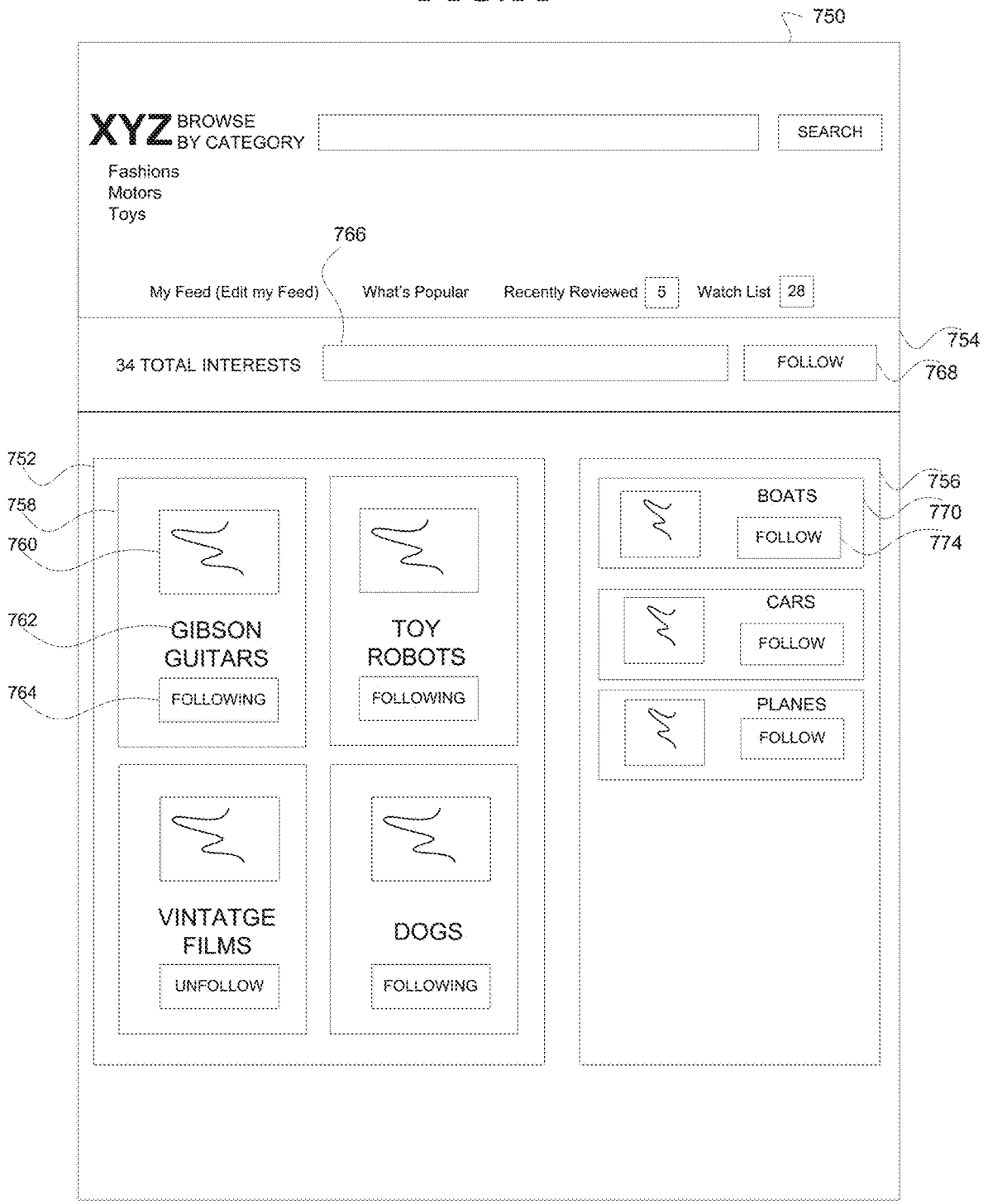
FIG. 11 is a diagram of a "Edit My Feed" user interface, according to an embodiment.

FIG. 11 is a diagram of an "Edit My Feed" user interface 750, according to an embodiment. The Edit My Feed" user interface 750, corresponds to the "Edit My Feed" interface 612 in FIG. 9 and, accordingly, the same or similar references have been used to indicate the same or similar features unless otherwise indicated. The "Edit My Feed" user interface 750 may facilitate the monitoring, addition and removal of interests 226. The "Edit My Feed" user interface 750 may include a follow panel 752, a search panel 754, and a suggestion panel 756.

The follow panel 752 may include multiple interest elements 770 that describe interests 226. Each interest element 758 may include an image 760, a title 762, and a user interface element 764 bearing the status "Following," indicating the interest 226 is presently being followed by the user. The user may stop following the interest 226. For example, the user may select the user interface element 764 causing the status to change to "Unfollow," as illustrated in the interest element 758 for "Vintage Films" on the bottom left of the follow panel 752. Responsive to the user selecting the user interface element 764, the receive module 21 may receive an interest identifier and the process module 23 may remove the interest 226 from the feed selection information 320 and the content selection information 322.

The search panel 754 may include an input box 766 and a user interface element 768. Responsive to the user selecting the user interface element 768, the receive module 21 may receive the keywords that were entered into the input box 766 by the user, the process module 23 may identify interests 226 based on the keywords, and the process module 23 may store the interests 226 as feed selection information 320 and content selection information 322. The suggestion panel 756 may include multiple suggestion elements 770. Each suggestion element 770 may include an image, a title, and a user interface element 774 with the status "Follow" indicating the interest 226 is presently not being followed by the user. The user may select the user interface element 774 to start following the interest. Responsive to the user selecting the user interface element 774, the receive module 21 may receive an interest identifier that is associated with the particular user interface element 774 and the process module 23 may add the interest 226 to the feed selection information 320 and the content selection information 322.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
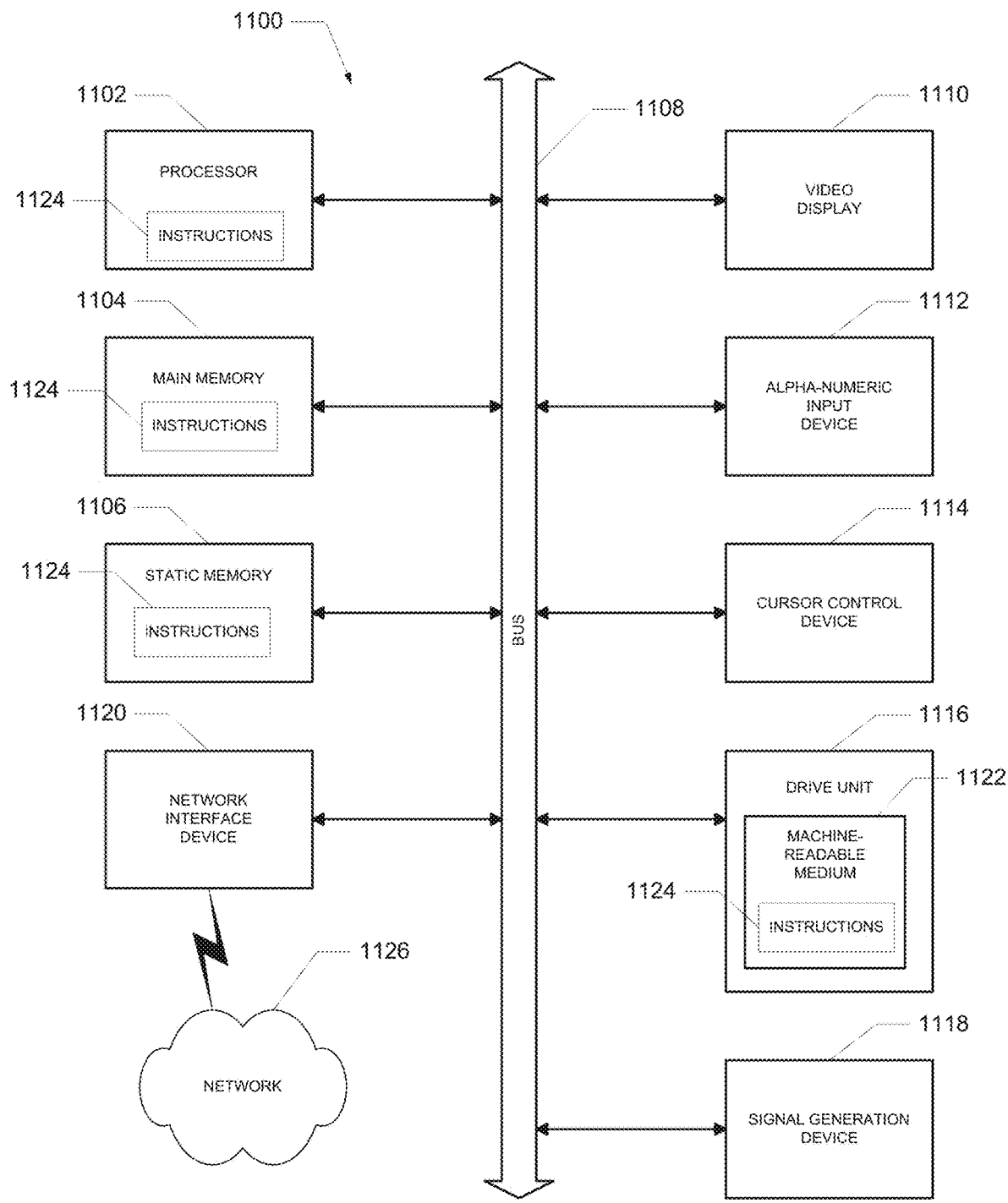
FIG. 12 shows a diagrammatic representation of a machine in the example form of a computer system, according to an example embodiment.

FIG. 12 is a block diagram of a machine within which instructions may be executed for causing the machine to perform any one or more of the methodologies discussed herein. In one example embodiment, the machine may be the user device 104. In one example embodiment, the machine may be the bid resolution processing system 110 and/or the offer processing system 108. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. Instructions may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized Accordingly, the specification and drawings are to be regarded in an illustrative rather than a restrictive sense.

Thus, feed in a network-based marketplace were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A method comprising:
   receiving, from a client machine over a network, a request associated with a user indicating to follow a feed that is associated with an interest;
   identifying, based on information that corresponds to the user, a plurality of feeds associated with a plurality of interests that are indicated as followed by the user, the plurality of feeds including the feed indicated by the request;
   causing the client machine to render a first user interface for displaying one or more listing elements of items for purchase selected from the plurality of feeds; and
   causing the client machine to render a second user interface for configuring feed selection information that is associated with the user, wherein the second user interface includes a plurality of status elements, each status element indicating whether a respective feed that is associated with a respective interest is being followed and being selectable to unfollow the respective feed.

2. The method of claim 1, further comprising causing display of a third user interface for configuring listing elements included in the feed associated with the interest.

3. The method of claim 1, wherein individual listing elements, of the one or more listing elements, include an image and a price of an item for sale via a network-based marketplace.

4. The method of claim 1, further comprising:
   receiving, from the client machine, an additional request indicating to unfollow an additional interest; and
   based on the additional request, updating the first user interface to exclude at least one listing element, of the one or more listing elements, that is associated with the additional interest.

5. The method of claim 1, wherein the one or more listing elements of items for purchase are associated with a network-based store that is at least partially personalized with respect to the user.

6. The method of claim 1, further comprising:
   receiving user input in association with the first user interface for displaying the one or more listing elements; and
   in response to the user input, dynamically updating the one or more listing elements within the first user interface.

7. The method of claim 1, wherein the plurality of feeds are associated with facilitating presentation of the one or more listing elements in a network-based marketplace, and wherein the network-based marketplace enables individual users to buy items, sell items, or both.

8. The method of claim 1, wherein each respective feed of the plurality of feeds includes listing elements of items for purchase relating to the respective interest.

9. The method of claim 1, wherein the second user interface includes a plurality of interest elements, and wherein each interest element is associated with an interest of the plurality of interests and includes a title of the interest, an image associated with the interest, and a status element of the plurality of status elements associated with the interest.

10. A system, comprising:
    at least one processor; and
    at least one computer storage media storing instructions that are executable by the at least one processor to:
    receive, from a client machine over a network, a request associated with a user indicating to follow a feed that is associated with an interest;
    identify, based on information that corresponds to the user, a plurality of feeds associated with a plurality of interests that are indicated as followed by the user, the plurality of feeds including the feed indicated by the request;
    cause the client machine to render a first user interface for displaying one or more listing elements of items for purchase selected from the plurality of feeds; and
    cause the client machine to render a second user interface for configuring feed selection information that is associated with the user, wherein the second user interface includes a plurality of status elements, each status element indicating whether a respective feed that is associated with a respective interest is being followed and being selectable to unfollow the respective feed.

11. The system of claim 10, wherein the instructions are further executable by the at least one processor to cause display of a third user interface for configuring listing elements included in the feed associated with the interest.

12. The system of claim 10, wherein individual listing elements, of the one or more listing elements, include an image and a price of an item for sale via a network-based marketplace.

13. The system of claim 10, wherein the instructions are further executable by the at least one processor to:
    receive, from the client machine, an additional request indicating to unfollow an additional interest; and
    based on the additional request, update the first user interface to exclude at least one listing element, of the one or more listing elements, that is associated with the additional interest.

14. The system of claim 10, wherein the one or more listing elements of items for purchase are associated with a network-based store that is at least partially personalized with respect to the user.

15. The system of claim 10, wherein the instructions are further executable by the at least one processor to:
    receive user input in association with the first user interface for displaying the one or more listing elements; and
    in response to the user input, dynamically update the one or more listing elements within the first user interface.

16. A non-transitory computer-readable storage medium storing instructions that, when executed by one or more hardware processors of a machine, cause the machine to perform operations comprising:

receiving, from a client machine over a network, a request associated with a user indicating to follow a feed that is associated with an interest;

identifying, based on information that corresponds to the user, a plurality of feeds associated with a plurality of interests that are indicated as followed by the user, the plurality of feeds including the feed indicated by the request;

causing the client machine to render a first user interface for displaying one or more listing elements of items for purchase selected from the plurality of feeds; and causing the client machine to render a second user interface for configuring feed selection information that is associated with the user, wherein the second user interface includes a plurality of status elements, each status element indicating whether a respective feed that is associated with a respective interest is being followed and being selectable to unfollow the respective feed.

17. The non-transitory computer-readable storage medium of claim 16, wherein the instructions further cause the machine to perform operations comprising:

causing display of a third user interface for configuring listing elements included in the feed associated with the interest.

18. The non-transitory computer-readable storage medium of claim 16, wherein individual listing elements, of the one or more listing elements, include an image and a price of an item for sale via a network-based marketplace.

19. The non-transitory computer-readable storage medium of claim 16, wherein the instructions further cause the machine to perform operations comprising:

receiving, from the client machine, an additional request indicating to unfollow an additional interest; and based on the additional request, updating the first user interface to exclude at least one listing element, of the one or more listing elements, that is associated with the additional interest.

20. The non-transitory computer-readable storage medium of claim 16, wherein the instructions further cause the machine to perform operations comprising:

receiving user input in association with the first user interface for displaying the one or more listing elements; and in response to the user input, dynamically updating the one or more listing elements within the first user interface.

* * * * *